US008966290B2

(12) United States Patent
Miki

(10) Patent No.: US 8,966,290 B2
(45) Date of Patent: Feb. 24, 2015

(54) WIRELESS COMMUNICATION TERMINAL AND CONTROL METHOD THEREOF

(75) Inventor: Tomohiro Miki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 1000 days.

(21) Appl. No.: 12/088,673

(22) PCT Filed: Sep. 29, 2006

(86) PCT No.: PCT/JP2006/319514
§ 371 (c)(1),
(2), (4) Date: Feb. 11, 2009

(87) PCT Pub. No.: WO2007/037398
PCT Pub. Date: Apr. 5, 2007

(65) Prior Publication Data
US 2010/0005321 A1    Jan. 7, 2010

(30) Foreign Application Priority Data
Sep. 29, 2005   (JP) .................................. 2005-285655

(51) Int. Cl.
*G06F 1/00* (2006.01)
*G06F 1/32* (2006.01)
*G06F 1/26* (2006.01)
*H04W 52/02* (2009.01)
*H04M 1/725* (2006.01)

(52) U.S. Cl.
CPC ............. *G06F 1/266* (2013.01); *G06F 1/3215* (2013.01); *H04W 52/0258* (2013.01); *H04M 1/72527* (2013.01)

USPC ........... 713/300; 713/320; 700/291; 700/295; 718/100; 718/102

(58) Field of Classification Search
USPC ........... 713/300, 320; 700/291, 295; 718/100, 718/102
See application file for complete search history.

(56) References Cited

U.S. PATENT DOCUMENTS

| 2003/0050104 A1* | 3/2003 | Matsumura et al. | .......... 455/574 |
| 2003/0114963 A1* | 6/2003 | Walker | .......... 700/291 |
| 2003/0217090 A1* | 11/2003 | Chauvel et al. | .......... 709/102 |
| 2005/0286422 A1* | 12/2005 | Funato | .......... 370/235 |
| 2006/0013235 A1* | 1/2006 | Farnham | .......... 370/401 |

FOREIGN PATENT DOCUMENTS

| JP | 08-006803 | 1/1996 |
| JP | 09-237138 | 9/1997 |
| JP | 11-316625 | 11/1999 |

(Continued)

OTHER PUBLICATIONS

Japanese Office Action and its translation dated Sep. 16, 2010 for counterpart foreign application No. JP 2005-285655 lists the references above.

*Primary Examiner* — Michael J Brown
(74) *Attorney, Agent, or Firm* — Studebaker & Brackett PC

(57) ABSTRACT

In a wireless communication terminal 103 that is supplied with power through an external device connection terminal to be power-supplied from a PC (electronic apparatus) 101 and performs a processing according to a schedule, a power supply state of the PC and a power consumption state in the wireless communication terminal are compared with each other, and when the comparison result exceeds a prescribed threshold value, the schedule is changed to control such that the comparison result does not exceed the threshold value.

9 Claims, 28 Drawing Sheets

(56) References Cited

FOREIGN PATENT DOCUMENTS

| JP | 2000-010676 | 1/2000 |
|---|---|---|
| JP | 2003-087172 | 3/2003 |
| JP | 2003-157415 | 5/2003 |
| JP | 2003-280775 | 10/2003 |
| JP | 2004-038295 | 2/2004 |
| WO | WO 2005/026929 A1 | 3/2005 |

* cited by examiner

FIG. 4(A)
DISPLAY 1

INSTALL FILTER DRIVER?

Yes/No

FIG. 4(B)
DISPLAY 2

WIRELESS COMMUNICATION TERMINAL
IS OPERATING STAND-ALONE.
WHEN CONTROL CAN BE PERFORMED
WITH PC, PROCESSING WILL START.

Yes/No

FIG. 4(C)
DISPLAY 3

FILTER DRIVER IS NOT SET VALID.
SET FILTER DRIVER VALID?

Yes/No

FIG. 9(A)
DISPLAY 11
IN CURRENT CONNECTION STATUS,
OPERATION HAS PROBLEM.
STOP OPERATION?
Yes/No
FIG. 9(B)
DISPLAY EXAMPLE OF DISPLAY 12
| IF FOLLOWING DEVICES ARE REMOVED, OPERATION WILL BE STABLY PERFORMED. REMOVE DEVICES? Yes No ||
|---|---|
|  | WIRELESS LAN |
|  | CD-R Drive |

FIG. 11

DISPLAY 21 DISPLAY EXAMPLE OF LIST OF OPERATIONS

| IF FOLLOWING DEVICES ARE REMOVED, OPERATION WILL BE STABLY PERFORMED. REMOVE DEVICES? Yes No | |
|---|---|
| ☐ | WIRELESS LAN |
| ☐ | 1×EV-DO (LIMITED) |
| ☐ | CD-R Drive |

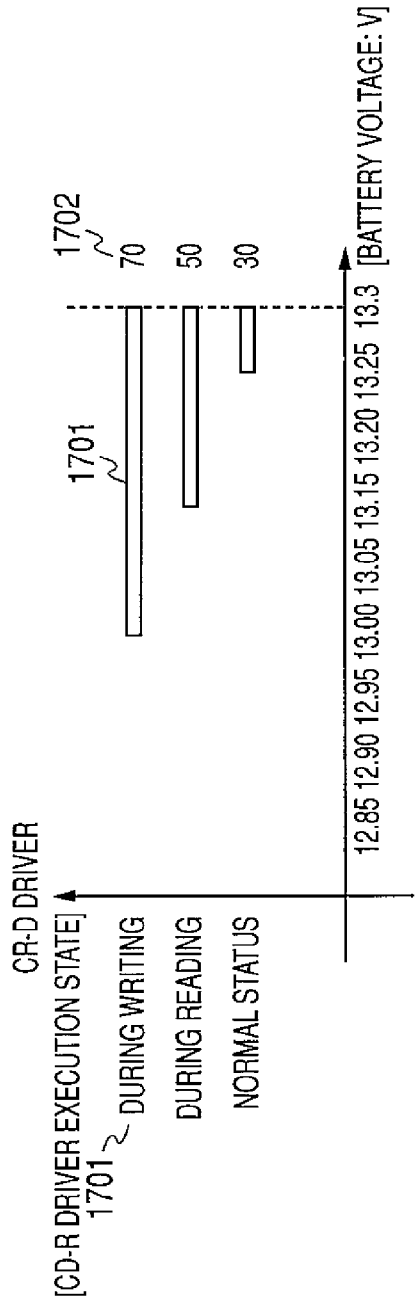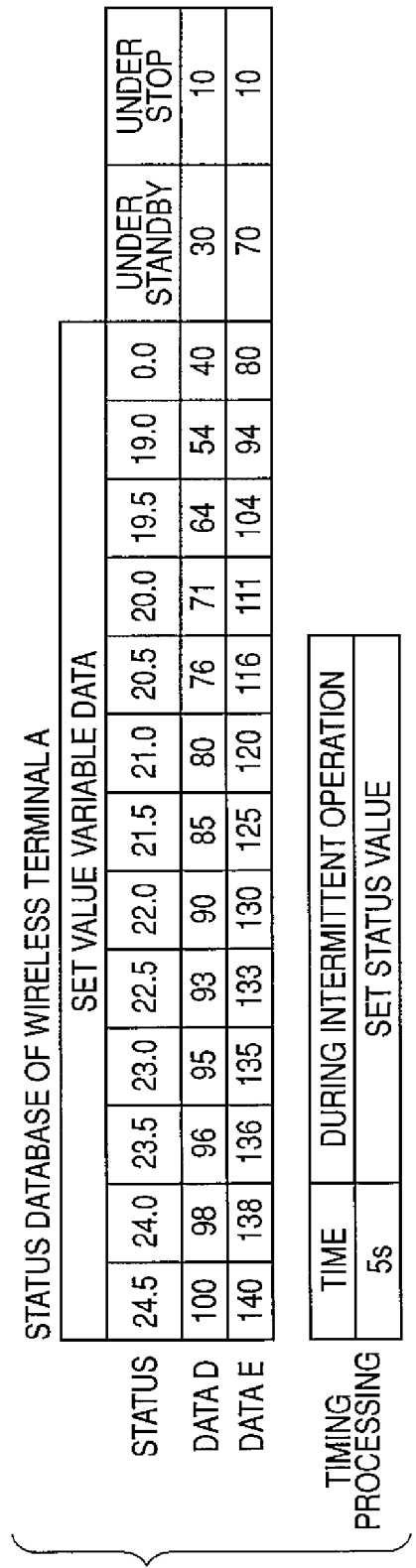

WIRELESS COMMUNICATION TERMINAL AND CONTROL METHOD THEREOF

TECHNICAL FIELD

The present invention relates a wireless communication terminal that is capable of being supplied with power through an external device connection terminal to be power-supplied from an electronic apparatus, such as a personal computer (PC).

BACKGROUND ART

With the recent improvement of a wireless communication infrastructure, wireless data communication with a portable electronic apparatus, such as a notebook computer (hereinafter, referred to as 'note PC'), outdoors is increasingly demanded.

In addition, under the infrastructure for wireless communication having different coverage or throughput, when wireless data communication is performed with the note PC outdoors, a plurality of wireless communication terminals having different careers may be connected to a single PC.

For example, when the note PC is used outdoors, power supply depends on a battery of the PC.

In recent years, there is known a note PC whose continuous operation time is 4 hours or 7 hours. In this case, the continuous time to be stated in this specification is based on the JEITA measurement method 1.0.

However, this measurement method gets a rough standard of the standalone operation time of the note PC, and measurement is performed in a state where no external device is connected thereto. Accordingly, the measurement method is not partially suitably used under the recent environment.

Recently, in regards to the external device, unlike a known low power consumption device, such as a USB mouse, an external storage device, such as a USB (Universal Serial Bus) memory or a CD-RW, a DVD-RW, or an HDD (Hard Disc Drive) has been used outdoors.

In case of such an external device, power supply depends on the battery of the PC.

As the wireless communication terminal that is connected to the note PC, there is known a wireless communication terminal that uses a wireless communication system corresponding to high data communication speed.

As the high-speed wireless communication terminal, a wireless LAN, which is used indoors, for example, an office, and a cellular system (CDMA2000 or W-CDMA), which is used over a wide area, may be exemplified.

The wide-area wireless communication terminal requires a baseband processor, such as a high-speed CPU (Central Processing Unit), or maximum transmission power of 20 dBm (100 mW) or more, which causes an increase of power consumption. For example, in case of CDMA2000 1× (and CDMA2000 1×EVDO), power consumption during maximum output transmission may be around 2.8 W.

The external device can be supplied with power from the note PC. In this case, power to be supplied is defined according to the specification. For example, a PCMCIA (Personal Computer Memory Card International Association) connector is 5 V 600 mA, Cardbus is 3.3 V 1 A, and a USB device is 5 V 500 mA.

However, these specifications may not take unexpected power consumption or the battery of the note PC into consideration.

In addition, among the note PCs, there are known the note PCs that use a method of taking precedence the operation time in the battery and setting a voltage to be supplied to an external interface (I/F) to a minimum normal value, or in which a supply current is lowered less than a normal value due to insufficient current supply ability when a large current flows.

Even if the external device is connected in a state where power is supplied, in view of convenience, the external device may be removed from the note PC, which is called 'hot plug'. Accordingly, an I/F between the external device and the note PC can be easily connected and disconnected, and thus the external device is not connected to the note PC until being used, which contributes to low power consumption.

Furthermore, as a method of reducing power consumption in the note PC, for example, there is generally used a method that changes an operation clock or a voltage according to the load condition of the CPU, or a method that halves luminance of a backlight of an LCD (Liquid Crystal Display) according to the connection state of a power supply, or takes a pause or lowers power according to set time or the condition of an internal battery.

Patent Document 1 discloses a method that supplies power from the outside to a device, to which insufficient power is supplied, separately from current supply from the external device connection terminal.

For the power control of an external device, Patent Document 2 discloses a method that, when a plurality of externally connected devices are connected together to the USB, and respectively consume power, supplies a limited amount of power based on the USB standard.

In regards to a cellular phone having an internal power supply, there is known a technology that, when a battery voltage is lowered, controls a transmission output such that the set value of the maximum transmission output is less than that during the normal operation, thereby suppressing transmission power.

Patent Document 1: JP-A-2000-10676
Patent Document 2: JP-A-2003-280775

DISCLOSURE OF THE INVENTION

Problem that the Invention is to Solve

In a wireless communication terminal that is supplied with power from an external device connection terminal, which can be supplied with power from a PC, when the note PC is used, a line is not continuously used, while line connection is performed as occasion demands. However, similarly to a usual cellular phone, the wireless communication terminal is in a standby state so as to receive a mail. For this reason, when the line is not used, the wireless communication terminal is not separated from the note PC.

A method of reducing power consumption in the note PC is to suppress power consumption of the CPU, but the control of the external device is not performed. For this reason, a battery power saving operation in the note PC cannot control power to the wireless communication terminal or an externally connected device. Accordingly, during the maximum output of the wireless communication terminal, the battery power of the note PC that supplies power temporarily drops, and then the note PC is in hang-up or forced shutdown.

If a plurality of wireless communication terminals are connected, an operation, for example, a transmission power or a power saving operation may be performed for each wireless communication terminal. In this case, however, it may be easily supposed that a control between the wireless communication terminals is not performed, and an operation, such as the transmission operation, which consumes a large amount of power, is concurrently performed between the wireless communication terminals.

According to the above-described method of reducing power consumption in the note PC, the specification of power to be supplied is set depending on the connection terminal. For example, similarly to the cellular phone, the known technology that changes the control of transmission power when the battery voltage is lowered lays focus on time-variant voltage drop due to battery power consumption, not voltage drop due to current consumption caused by the transmission output. That is, it is not supposed that the voltage to be supplied drops by current consumption. In addition, even if the external device is connected, and sufficient power may be supplied when an unexpected situation does not occur during power supply, as a countermeasure against unexpected voltage drop when the transmission power is rapidly increased (when communication starts or when the transmission output needs to be increased due to a shield between the terminal and the base station during mobile communication) or temporary voltage drop when the externally connected device is connected, the above-described method of reducing power consumption in the note PC is not sufficient.

Then, the note PC may be lacking in power or suffer from temporary lack of power, and then the note PC may be paused or in forced shutdown.

In regards to an additional external device, since the note PC is lacking in power, disc data may be lost due to a write error while data is written in a write-once storage medium, such as CD-R.

In particular, when the wireless communication terminal performs a standby operation, according to a terminal to be connected, it may not be possible to meet a case where unexpected voltage drop occurs. This is because voltage drop occurs due to an inrush current during an intermittent standby operation.

An external device that is supposed to be lacking in power may be supplied with power from the outside, but it cannot be used outdoors.

According to the method disclosed in Patent Document 2, in which, when power supply is possible with a single terminal, power control is performed on that terminal, all the external device are supplied with power from the same I/F, and it is necessary to additionally provide a circuit based on the same specification for the external devices. In addition, since the control I/F is a single system, it cannot control all of the externally connected devices.

It is an object of the invention to provide a portable communication terminal that, when unexpected voltage drop or voltage drop when an externally connected device is connected occurs, enables an electronic apparatus to control a wireless communication terminal, thereby performing a control according to a power supply ability of the electronic apparatus, and a control method thereof.

Means for Solving the Problem

According to a first aspect of the invention, there is provided a control method of a wireless communication terminal, which is supplied with power through an external device connection terminal to be power-supplied from an electronic apparatus and performs a processing according to a schedule. The control method includes comparing a power supply state of the electronic apparatus with a power consumption state in the wireless communication terminal, and when the comparison result exceeds a prescribed threshold value, changing the schedule to control such that the comparison result does not exceed the threshold value.

When an external device that is supplied with power using the external device connection terminal is connected to the electronic apparatus, the power supply state of the electronic apparatus and a power consumption state of an external device may be compared with each other, and when the comparison result exceeds a prescribed threshold value, the schedule may be changed to control such that the comparison result does not exceed the threshold value.

Configuration data created on the basis of status data of the wireless communication terminal and at least one threshold value may be compared with each other.

When a plurality of wireless communication terminals are connected to the electronic apparatus, configuration data created on the basis of status data of each wireless communication terminal and the threshold value may be compared with each other.

When, in a standalone wireless communication terminal, over-threshold occurs, a set value in set value-variable data associated with configuration data after timing setting may be decreased.

When an operation in the standalone wireless communication terminal is impossible after timing setting, a variable value from the set value variable data may be decreased to control such that the over-threshold does not occur.

When a plurality of set value variable data exist, if configuration data in an additional wireless communication terminal exceeds the threshold value even though a set value is decreased to configuration data of a predetermined wireless communication terminal, a set value of the additional wireless communication terminal may be decreased such that the over-threshold does not occur.

According to a second aspect of the invention, there is provided a wireless communication terminal, which is supplied with power through an external device connection terminal to be power-supplied from an electronic apparatus and performs a processing according to a schedule. The wireless communication terminal includes: a unit that compares a power supply state of the electronic apparatus with a power consumption state in the wireless communication device, and when the comparison result exceeds a prescribed threshold value, the unit changes the schedule according to an instruction from the electronic apparatus to control such that the comparison result does not exceed the threshold value.

Advantage of the Invention

According to the invention, when unexpected voltage drop or voltage drop due to the connection of the externally connected device occurs, it is possible to enable the electronic apparatus to control the wireless communication terminal. As a result, a control can be performed according to the power supply ability of the electronic apparatus.

BRIEF DESCRIPTION OF THE DRAWINGS

FIG. 4(A) is a diagram showing a display example during the processing shown in FIG. 3.

FIG. 4(B) is a diagram showing a display example during the processing shown in FIG. 3.

FIG. 4(C) is a diagram showing a display example during the processing shown in FIG. 3.

FIG. 9(A) is a diagram showing a display example during the processing shown in FIG. 8.

FIG. 9(B) is a diagram showing a display example during the processing shown in FIG. 8.

FIG. 11 is a diagram showing a display example during the processing shown in FIG. 10.

FIG. 24 is a diagram illustrating a standalone operation confirmation processing in FIG. 12 when an external device is a CD-R drive.

FIG. 25 is a diagram showing status data of the wireless communication terminal A.

DESCRIPTION OF REFERENCE NUMERALS AND SIGNS

100 EXTERNAL CONNECTION CONTROL SYSTEM
101 NOTE PC (NOTEBOOK PERSONAL COMPUTER)
102 DISPLAY DEVICE
103, 104 WIRELESS COMMUNICATION TERMINAL
105, 106 EXTERNAL DEVICE
107 GENERAL-USE I/F (INTERFACE) CONNECTING SECTION
108 DEVICE MANAGER
109 RESOURCE DETECTING SECTION
110 BATTERY POWER/CPU UTILIZATION/MEMORY USAGE INFORMATION HOLDING SECTION
111 EXTERNAL DEVICE DETECTING SECTION
112 WIRELESS COMMUNICATION TERMINAL OPERATION SETTING SECTION
113 WIRELESS COMMUNICATION TERMINAL OPERATION CONFIRMATION PROCESSING SECTION
114 STANDALONE OPERATION CONFIRMATION PROCESSING SECTION
115 DATABASE (STORAGE UNIT)
115 WIRELESS ACCESS SETUP PROCESSING SECTION
117 ADDITIONAL WIRELESS TERMINAL SCHEDULE PROCESSING SECTION
118 WIRELESS COMMUNICATION SETUP INTRODUCING SECTION
119 APPLICATION SECTION
120 API
121 OS SECTION
131 BASEBAND SECTION
132 TRANSMITTING SECTION
133 RECEIVING SECTION

134 DUPLEXER
135 ANTENNA
136 TRANSMISSION CONTROL SECTION

BEST MODE FOR CARRYING OUT THE INVENTION

Hereinafter, an embodiment of the invention will be described with reference to the drawings.

Figure 1:
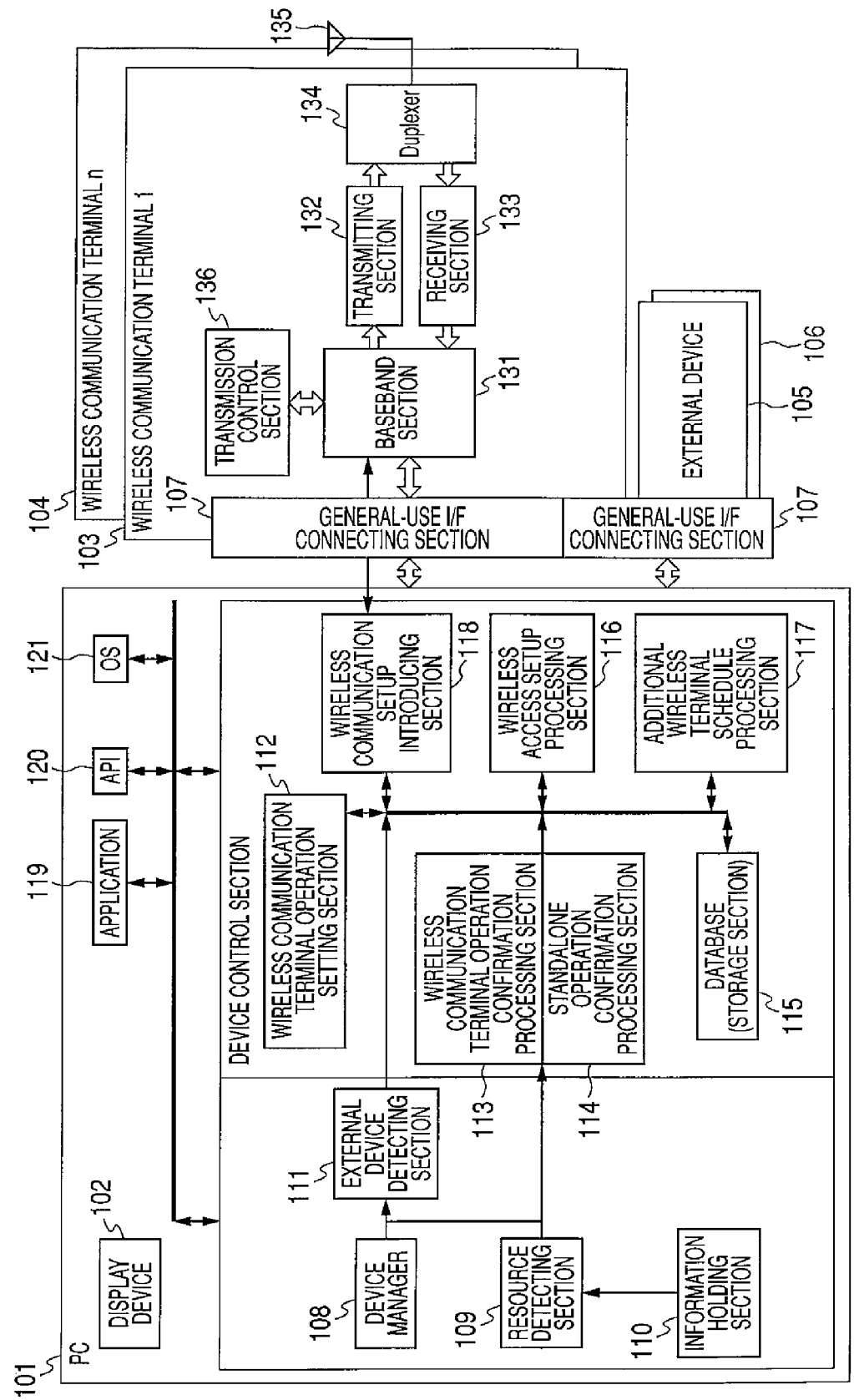
FIG. 1 is a block diagram showing the exemplary configuration of a device connection system according to an embodiment of the invention.

FIG. 1 is a block diagram showing the exemplary configuration of a device connection control system according to an embodiment of the invention The system 100 primarily includes a note PC (notebook personal computer) 101 as an electronic apparatus, a display device 102, wireless communication terminals 103 and 104, external devices 105 and 106, and general-use I/F (interface) connecting sections 107.

In the system 100, the wireless communication terminals 103 and 104 and the external devices 105 and 106 are connectable to the note PC 101 through the general-use I/F connecting sections 107 each having an external device connection terminal to be power-supplied. Power supply to the wireless communication terminals 103 and 104 and the external devices 105 and 106 is performed from the note PC 101 through the general-use I/F connecting sections 107.

The general-use I/F connecting sections 107 are connection I/F circuits to be power-supplied. In this case, a plurality of general-user I/F connecting sections 107 are mounted on the note PC 101 in forms of USB or IEEE 1394 and PcCard.

Referring to FIG. 1, the wireless communication terminals 103 and 104 or the external devices 105 and 106 are connected to the note PC 101 through the general-use I/F connecting sections 107.

As shown in FIG. 1, in addition to the display device 102 and the general-use I/F connecting sections 107, the note PC 101 includes a device manager 108, a resource detecting section 109, a battery power/CPU utilization/memory usage information holding section 110, an external device detecting section 111, a wireless communication terminal operation setting section 112, a wireless communication terminal operation confirmation processing section 113, a standalone operation confirmation processing section 114, a database (storage section) 115, a wireless access setup processing section 116, an additional wireless terminal schedule processing section 117, a wireless communication setup introducing section 118, an application section 119, an API (Application Processing Interface) 120, and an OS (Operating System) 121.

The device manager 108 mounts thereon and manages a device that is connected to the note PC 101.

The resource detecting section 109 detects the battery power or measures the CPU utilization or the memory usage on the basis of the information of the information holding section 110.

The external device detecting section 111 detects a device, which is connected to the note PC 101, on the basis of information from the device manager 108.

The note PC 101 compares the detected information with information of the database 115 by the external device detecting section 111, and if the same configuration as the connection configuration in the database 115, controls the wireless communication terminals 103 and/or 104 connected to the general-use I/F connecting section 107 through the wireless communication setup introducing section 118.

When the external device detecting section 111 does not detect the same configuration, the wireless communication terminal operation setting section 112 creates data, which is required for the wireless communication setup introducing section 118 and to be stored in the database 115.

The wireless terminal operation confirmation processing section 113 extracts a resource required for creating a database of a wireless communication terminal from the resource detecting section 109, and stores the extracted resource in the database 115.

The standalone operation confirmation processing section 114 extracts a resource required for creating a database of an external device from the resource detecting section 109, and stores the extracted resource in the database 115.

If a simultaneous operation by the additional wireless terminal schedule processing section 117 cannot be performed, the wireless access setup processing section 116 sets operation timing for each wireless communication terminal.

If a plurality of wireless communication terminals are connected, the additional wireless terminal schedule processing section 117 performs a processing to determine whether or not to simultaneously operate the wireless communication terminals.

The wireless communication setup introducing section 118 creates an API on the basis of the data in the database 115, and changes a control method by a user through application section 119 or performs a control by the OS section 121 by executing the API from the OS section 121.

As shown in FIG. 1, each of the wireless communication terminals 103 and 104 primarily includes a baseband section 131, a transmitting section 132, a receiving section 133, a duplexer 134, an antenna 135, and a transmission control section 136.

The baseband section 131 usually controls the wireless communication terminal, such that the transmission control section 136 controls the transmitting section 132 or the baseband section 131 controls the reception of the receiving section 133, and wireless transmission/reception through the antenna 135 is controlled through the duplexer 134.

The transmission control section 136 usually performs a transmission control in the wireless communication terminal, but by the wireless communication setup introducing section 118, the note PC 101 may perform the transmission control.

Figure 2:
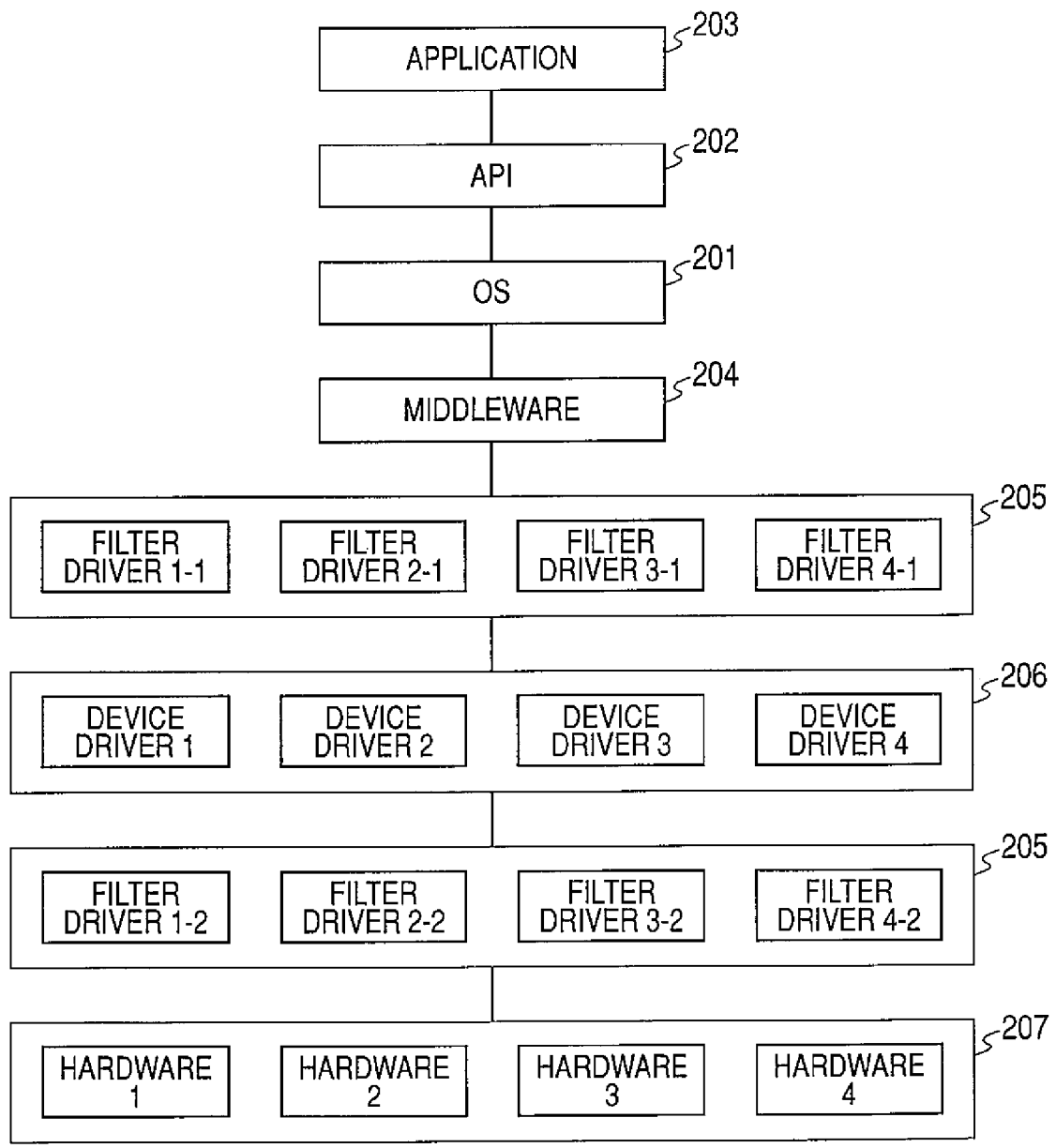
FIG. 2 is a diagram showing the exemplary structure of the system according to this embodiment.

FIG. 2 is a diagram showing the exemplary structure of the system according to this embodiment.

In FIG. 2, reference numeral 201 denotes an OS. The OS 201 is a core in the system. Moreover, in this embodiment, as the OS, Windows (Registered Trademark) is used.

The API 202 is provided above the OS 201, and the actual application 203 is above the API 202.

Meanwhile, below the OS 201 are provided middleware 204 and a device driver 206 for operating hardware 207.

In this embodiment, to detect and control each external device, a filter driver 205 is used. The filter driver 205 may be installed on one or both of the upper and lower layers of the device driver 206. In addition, the upper layers from the application to middleware may control the filter driver 205.

A procedure of introducing a filter driver will now be described.

Figure 3:
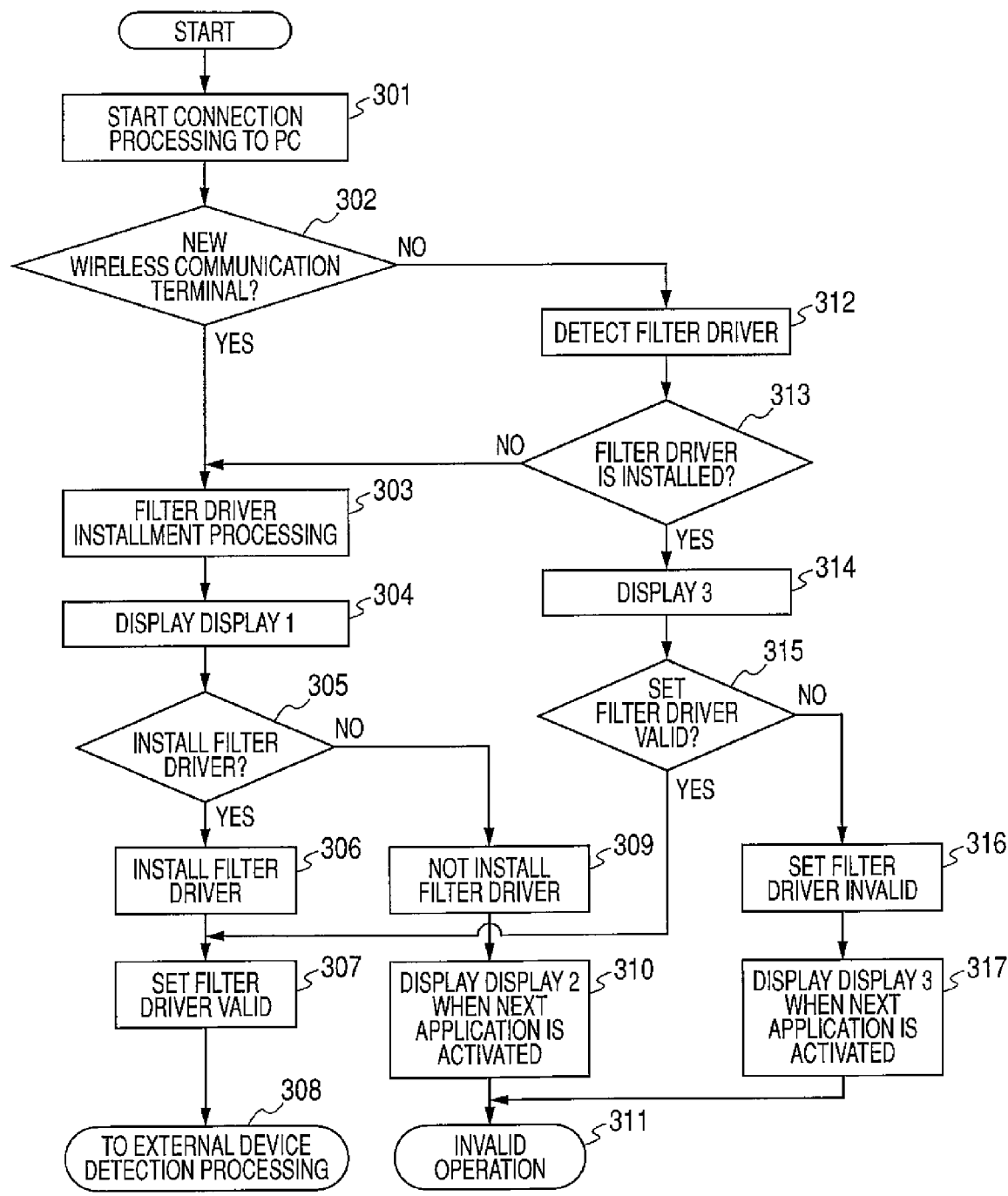
FIG. 3 is a flowchart of filter driver introduction according to this embodiment.

FIG. 3 is a flowchart of filter driver introduction according to this embodiment.

FIGS. 4(A) to 4(C) are diagrams showing display examples during the processing shown in FIG. 3.

At Step 301, a connection processing to the PC starts. At this time, in the wireless communication terminal, a circuit required for connection to the PC 101 is activated.

At Step 302, it is detected whether or not a wireless communication terminal to be used is a new wireless communication terminal. If it is a new wireless communication terminal, after the device driver is installed, at Step 303, an installment processing of the filter driver starts.

Next, at Step 304, a display screen (display 1) shown in FIG. 4(A) is displayed, on which a user can select whether or not to introduce the filter driver.

At Step 305, if it is selected to install the filter driver, at Step 306, the filter driver is installed. At Step 307, the filter driver is set valid, and the process progresses to an external device detection processing at Step 308.

At Step 305, if it is selected not to install the filter driver, at Step 309, the filter driver is not installed. Next, at Step 310, when the application of the wireless communication terminal is activated, a display screen (display 2) shown in FIG. 4(B) is displayed. At Step 311, as an invalid operation, the wireless communication terminal operates stand-alone.

At Step 302, if it is not a new wireless communication terminal, at Step 312, through filter driver detection, it is detected whether or not a filter driver is installed. If it is detected at Step 312 that the filter driver is not installed, at Step 313, the process progresses to Step 304.

If it is detected at Step 313 that the filter driver is installed, at Step 314, in order to select whether or not to set the filter driver valid, a display screen (display 3) shown in FIG. 4(C) is displayed.

At Step 315, if it is selected to set the filter driver valid, the process progresses to Step 307. At Step 315, if it is selected to set the filter driver invalid, at Step 316, the filter driver is set invalid. Next, at Step 317, when a next application is activated, the display 3 is displayed, and then the process progresses to Step 311. At Step 311, as the invalid operation, the wireless communication terminal operates stand-alone.

Next, an external device detection processing will be described.

Figure 5:
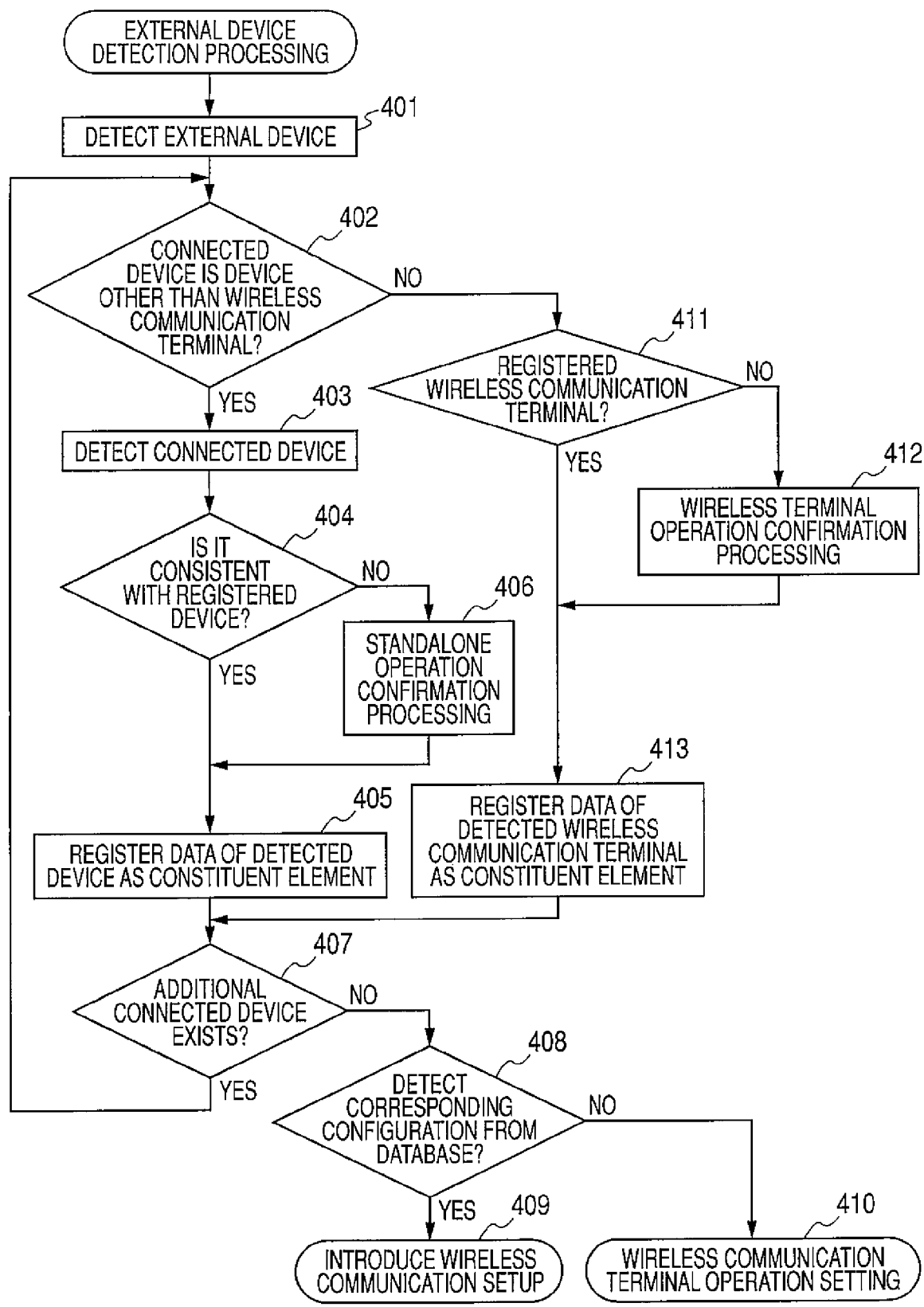
FIG. 5 is a flowchart of external device detection according to this embodiment.

FIG. 5 is a flowchart of external device detection according to this embodiment.

From FIG. 3, if the filter driver is set valid, at Step 401, the external device detecting section 111 detects a device.

If it is determined at Step 402 that an external device other than the wireless communication terminal is connected, at Step 403, a connected device is detected. Even if a plurality of devices are connected, detection and control can be performed by inserting a filter driver with respect to each device driver.

If it is determined at Step 404 that the external device is consistent with a device registered in the database, at Step 405, data of the detected device is registered as a constituent element. If it is determined at Step 404 that the external device is a new device, at Step 406, a standalone operation confirmation processing is performed, and then the process returns to Step 405. At Step 407, if it is determined that all of the external devices are not registered, the process returns to Step 402. Moreover, the standalone operation confirmation processing at Step 406 will be described below.

If it is determined at Step 402 that a wireless communication terminal is connected, at Step 302 of FIG. 3, it is determined whether or not a new wireless communication terminal including the connected wireless communication terminal is a registered wireless communication terminal. If it is determined that the connected wireless communication terminal is a new wireless communication terminal, at Step 412, a wireless terminal operation confirmation processing is performed. Then, the process progresses to Step 413.

At Step 413, data of the wireless communication terminal is registered as a constituent element, and then the process progresses to Step 407.

At Step 407, if all of the external devices including the wireless communication terminal are completely registered, at Step 408, a corresponding configuration is detected from the data of the database 115. When the same configuration exists, at Step 409, the process passes to the wireless communication setup introducing section 118. If it is determined at Step 408 that a configuration is new, wireless communication terminal operation setting at Step 410 is performed, and then wireless communication setup is introduced.

Next, a wireless communication terminal operation setting processing of the wireless communication terminal operation setting section 112 will be described.

Figure 6:
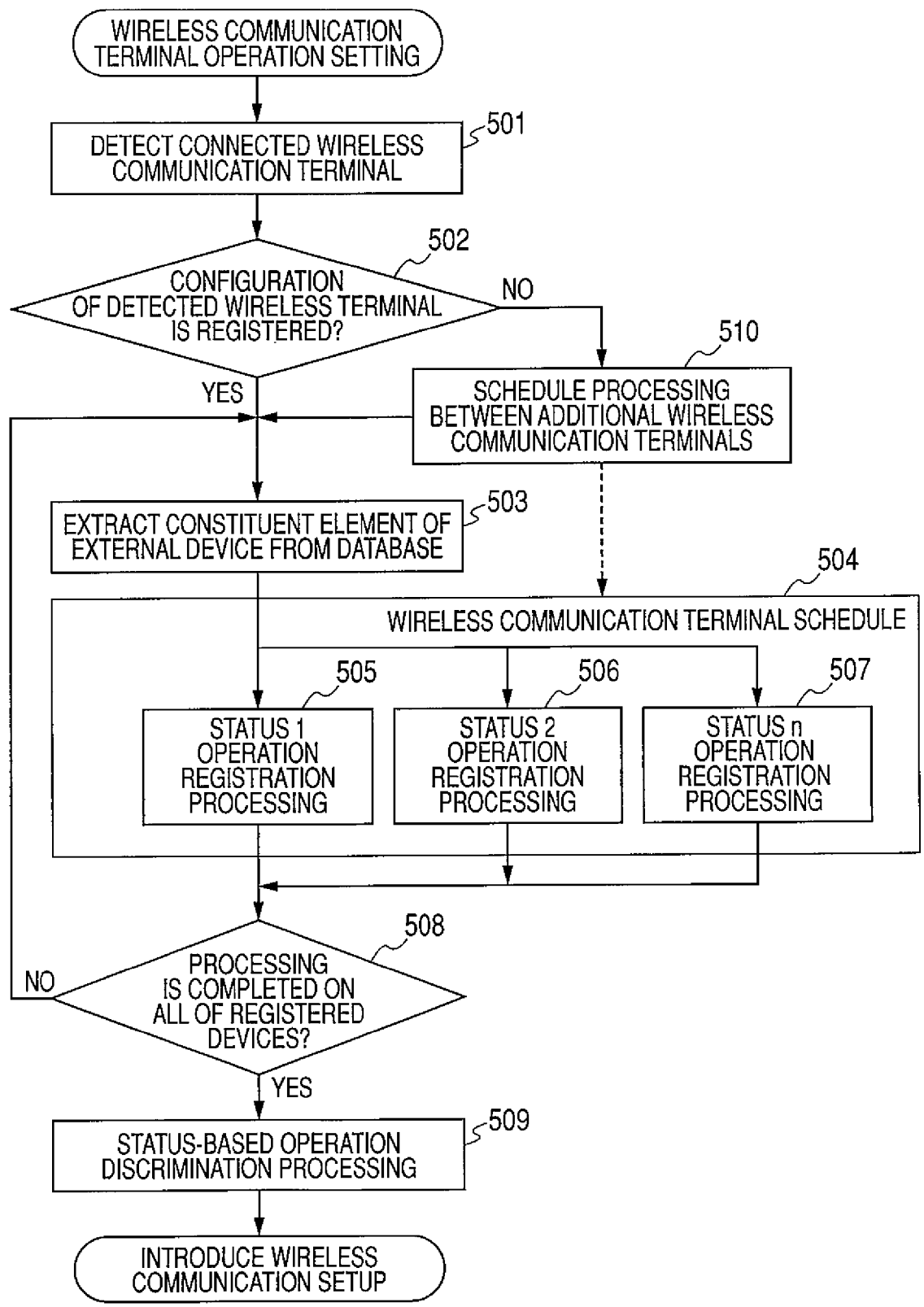
FIG. 6 is a flowchart of a wireless terminal operation setting processing at Step 410 shown in FIG. 5.

FIG. 6 is a flowchart of a wireless terminal operation setting processing at Step 410 shown in FIG. 5.

At Step 501, when the connected wireless communication terminal is detected, all of the wireless communication terminals are detected. This is because a wireless communication terminal moves into a low power consumption mode, such as intermittent reception or standby, and then when a plurality of wireless communication terminals exist, a response condition is changed.

At Step 502, it is determined that the configuration of the detected wireless communication terminal is registered in the database. When the corresponding configuration is registered, a combination between the wireless terminals is optimized. Then, at Step 503, for the external device other than the wireless communication terminal, the constituent element registered at Step 405 of FIG. 5 is extracted from the database 115.

At Steps 505, 506, and 507, the statuses are sorted, and the constituent element of each device is allocated to each status on the basis of a wireless communication terminal schedule at Step 504.

At Step 508, it is confirmed whether or not the allocation is completed for all of the detected devices. When the allocation is not completed, the process returns to Step 503. When the allocation is completed, the process progresses to a status-based operation discrimination processing at Step 509.

If it is determined at Step 502 that the configuration is not registered, the process progresses to Step 510, and a schedule processing between additional wireless communication terminals is performed. This is performed to optimize, when a plurality of wireless communication terminals exist, the operation of each wireless communication terminal with respect to the note PC 101.

Next, a status-based operation discrimination processing will be described.

Figure 7:
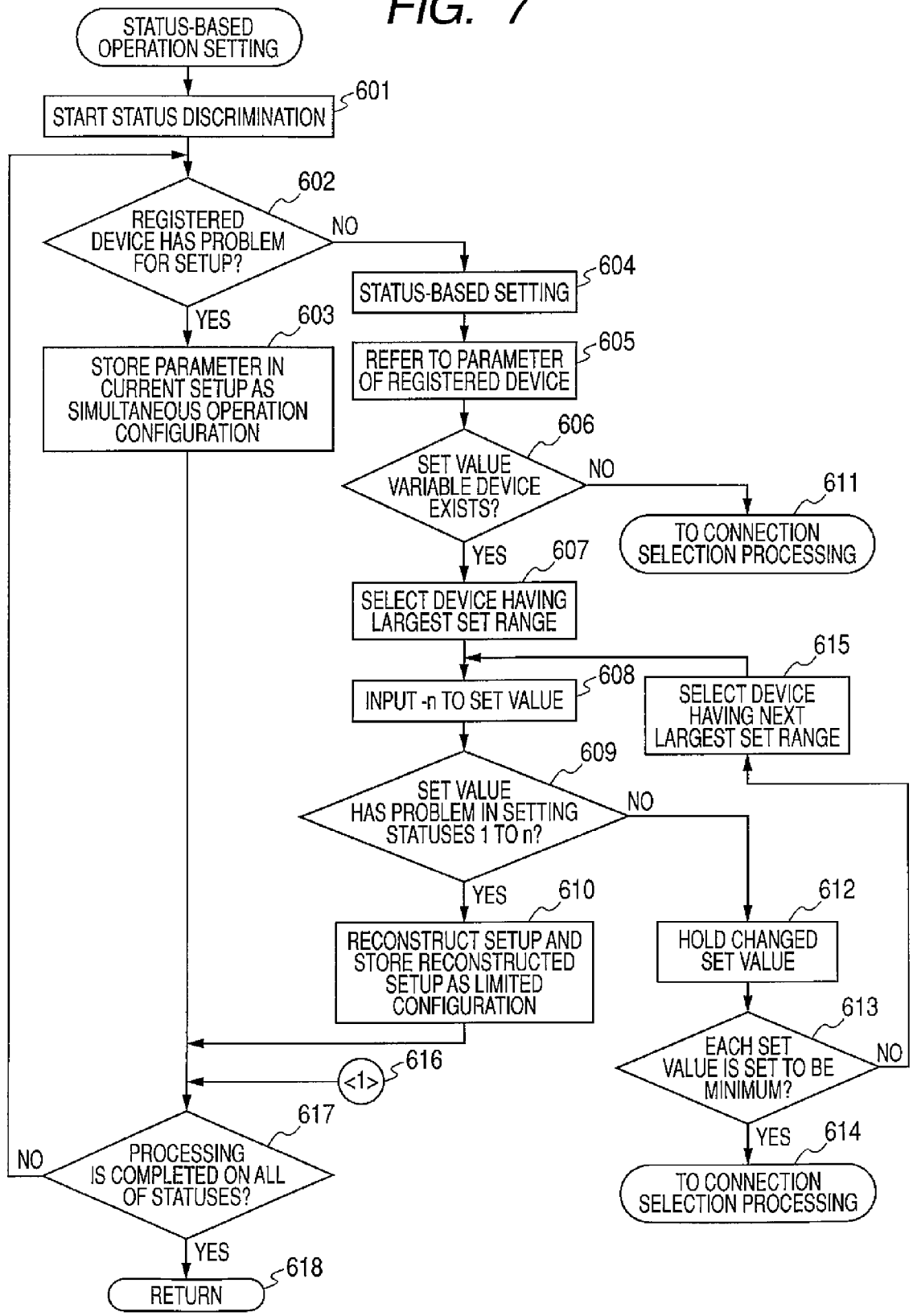
FIG. 7 is a flowchart of a status-based operation setting processing according to this embodiment.

FIG. 7 is a flowchart of a status-based operation setting processing according to this embodiment.

At Step 601, status discrimination starts.

At Step 602, it is determined whether or not registered devices can operate simultaneously per status. When the registered devices can operate simultaneously, at Step 603, a parameter in the current setup is stored. Then, if it is determined at Step 617 that the processing is completed on all of the statuses, at Step 618, the process returns to the former flowchart. Here, the parameter stored at Step 603 is used during the discrimination at Step 408 shown in FIG. 5.

If it is determined at Step 602 that the status has a problem, status-based setting at Step 604 is performed. At Steps 605 and 606, within the parameter on the status having a problem, a device that has variable set data is detected, and a device that has a width in a set value from the variable set data is detected.

At Step 607, a device having a largest width in the set value is selected. At Step 608, a value obtained by subtracting n from the set value is set as a set value. If it is determined at Step 609 that the operation does not have a problem with the value set at Step 608, at Step 610, reconstruction is performed for each status of the current setup, and the process progresses to Step 617.

If it is determined at Step 606 that a settable device does not exist, a connection selection processing at Step 611 is performed.

If it is determined at Step 609 that the set value has a problem, at Step 612, a changed set value is held, and at Step 613, it is confirmed whether or not all of settable values are the minimum. When all of the values are the minimum, the process progresses to a connection selection processing at Step 614.

If it is determined at Step 613 that all of the values are not the minimum, with the set value changed, at Step 615, a device that has a next largest set value is selected, and then the process returns to Step 608.

Next, a connection selection processing will be described.

Figure 8:
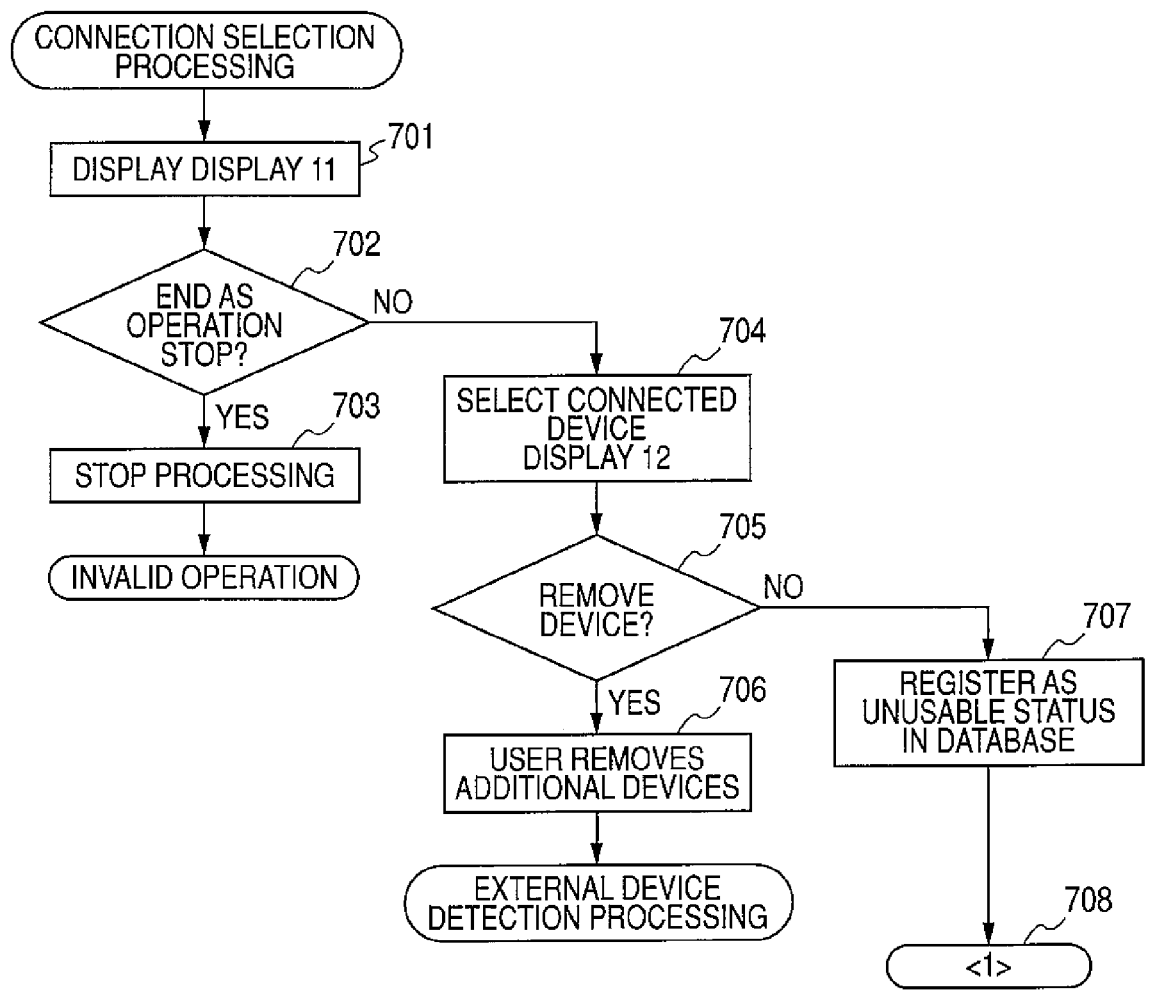
FIG. 8 is a flowchart of a connection selection processing according to this embodiment.

FIG. 8 is a flowchart of a connection selection processing according to this embodiment.

FIGS. 9(A) and 9(B) are diagrams showing display examples during the processing shown in FIG. 8.

At Step 701, a display screen (display 11) shown in FIG. 9(A) may be displayed. Next, at Step 702, the user determines whether or not to stop the operation since wireless communication cannot be performed. If the user determines to stop the operation, at Step 703, the operation of the wireless communication terminal is stopped, which becomes the invalid operation.

If it is determined at Step 702 not to stop the wireless communication terminal, at Step 704, a list of connected devices may be displayed by a display screen (display 12) shown in FIG. 9(B). At Step 705, when the user removes an unused device, since the hardware configuration changes, the external device detection processing sequence is executed again. At Step 705, when the unused is not removed, at Step 707, an unusable status is stored in the database, and the process progresses from <1> of Step 708 to <1> of Step 616 of FIG. 7.

Next, a processing in the wireless communication setup introducing section 118 will be described.

Figure 10:
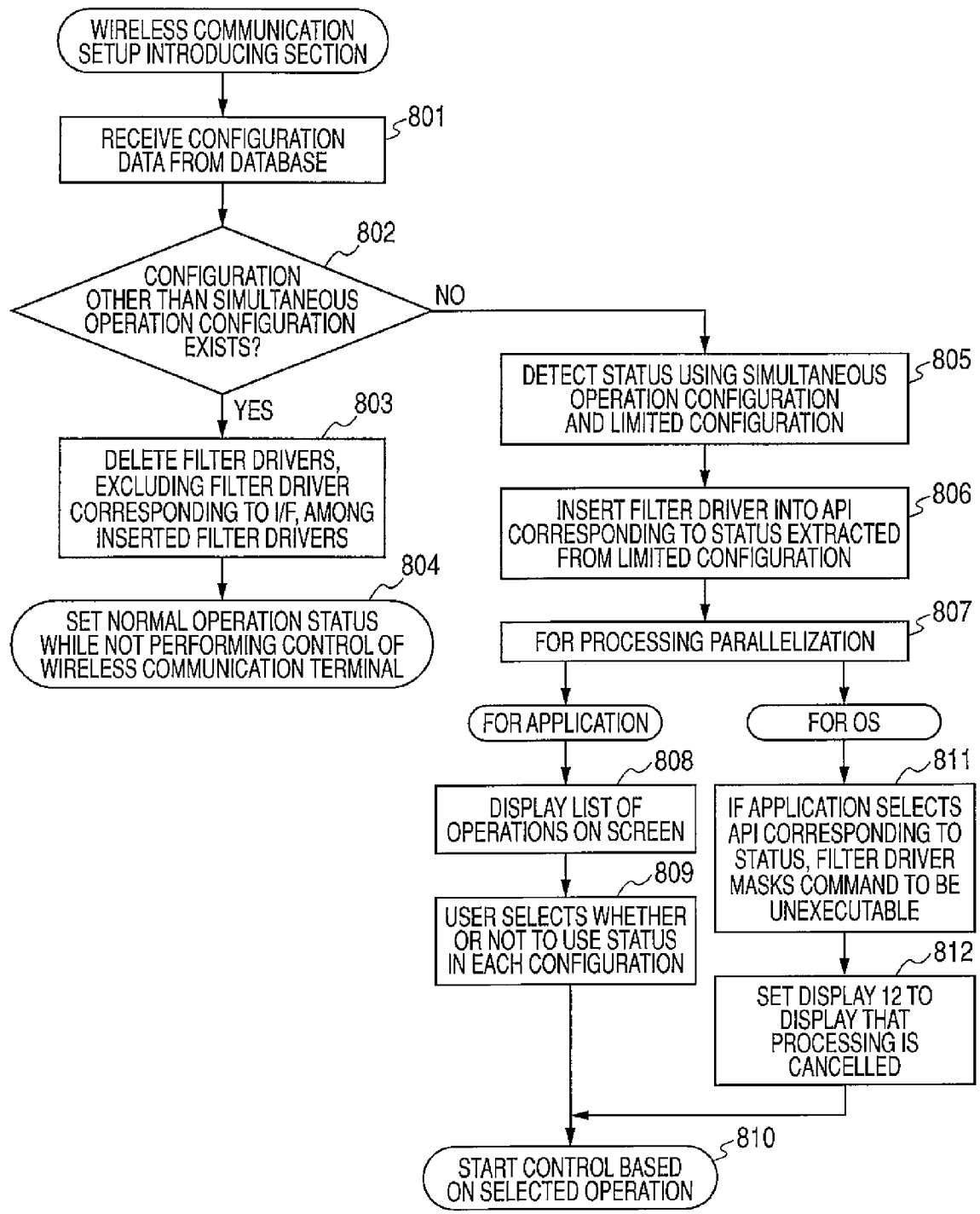
FIG. 10 is a flowchart of a processing in a wireless communication setup introducing section according to this embodiment.

FIG. 10 is a flowchart of a processing in a wireless communication setup introducing section according to this embodiment. FIG. 11 is a diagram showing a display example during the processing shown in FIG. 10.

At Step 801, configuration data is taken out from the database 115. At Step 802, it is confirmed from the data acquired at Step 801 whether or not configuration data other than simultaneous operation configuration exists. When only the simultaneous operation configuration data exists, at Step 803, filter drivers other than a filter driver with respect to the external connection I/F are set invalid, and thus a load when a filter driver usually enters is reduced. At Step 804, since a normal operation can be performed, the control on the wireless communication terminal is not performed.

At Step 802, when limited configuration is present in the data, the status is extracted by category from all of the acquired configurations. At Step 806, a filter driver is inserted into the API that instructs the extracted status. At Step 807, the following sequence is performed on the application and the OS through processing parallelization.

During setting in the application, a list of operations is displayed by a display screen (display 21) shown in FIG. 11, and an operation is set for each configuration such that the user can set the operation. At this time, for a limited status and an unusable status, an OFF status is set, while an ON status cannot be set.

At Step 80D, if the selection is completed, the operation starts.

During setting in the OS, in regards to the extracted status, at Step 811, a command is masked for the unusable configuration and status, and then it becomes unexecutable. At Step 812, if an additional application is allowed to be executed from the API, the selected processing is cancelled is set to be performed by the display 21. At Step 809, the operation starts.

Next, a primary processing in each flowchart will be described.

First, the standalone operation confirmation processing at Step 406 shown in FIG. 5 will be described.

Figure 12:
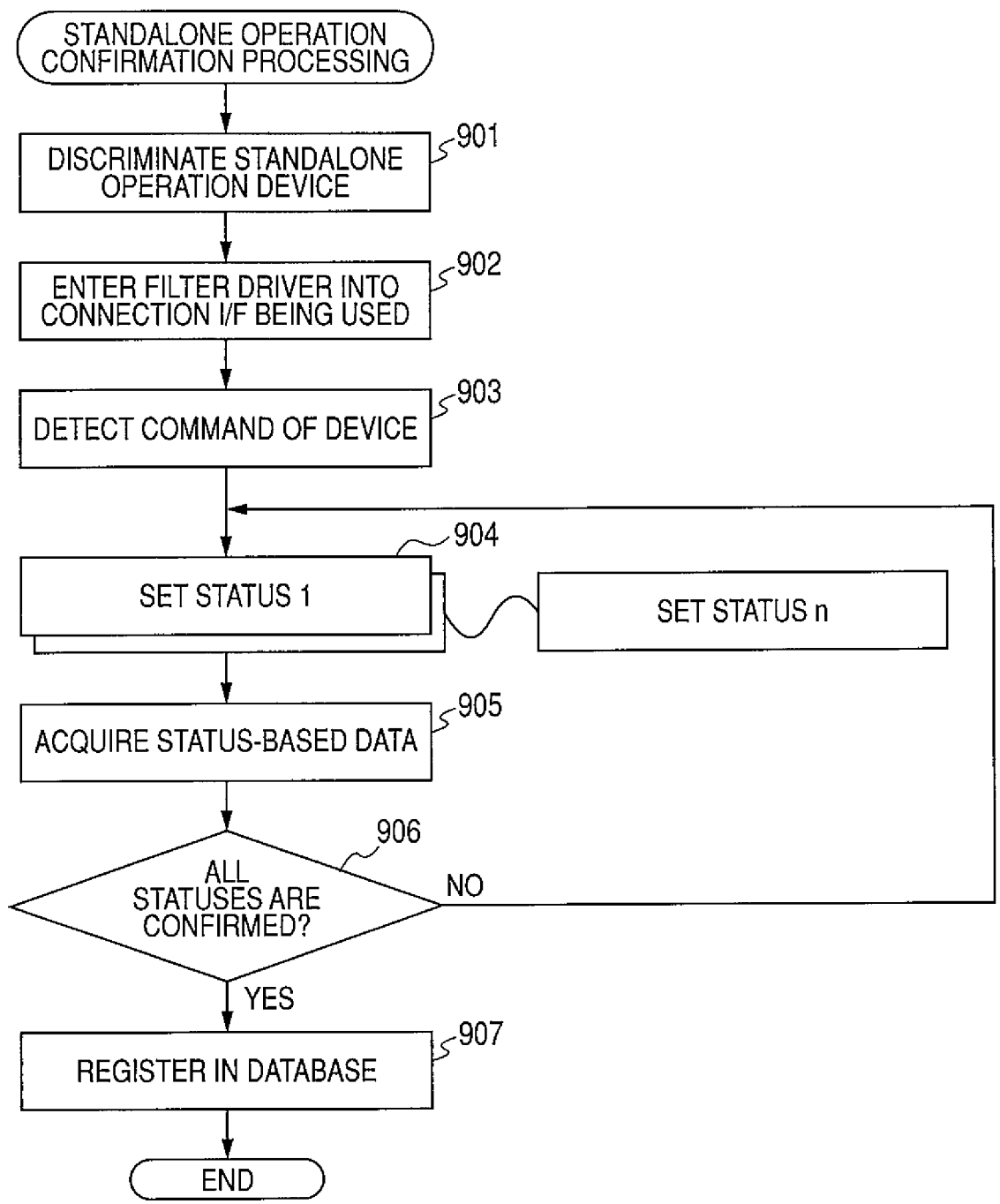
FIG. 12 is a flowchart of a standalone operation confirmation processing at Step 406 shown in FIG. 5.

FIG. 12 is a flowchart showing a standalone operation confirmation processing at Step 406 shown in FIG. 5.

At Step 901, standalone operation device discrimination is performed. At Step 902, a filter driver being used enters, such that the behavior can be monitored. At Step 903, a command of a device discriminated to acquire data is searched, and is set as a status. With the filter driver, a command when the application accesses the device driver is monitored, and the status is discriminated.

At Step 905, for each sorted status, data is acquired. At Step 906, if all of data are acquired, a database is created per status, and at Step 907, it is registered in the database.

Figure 13:
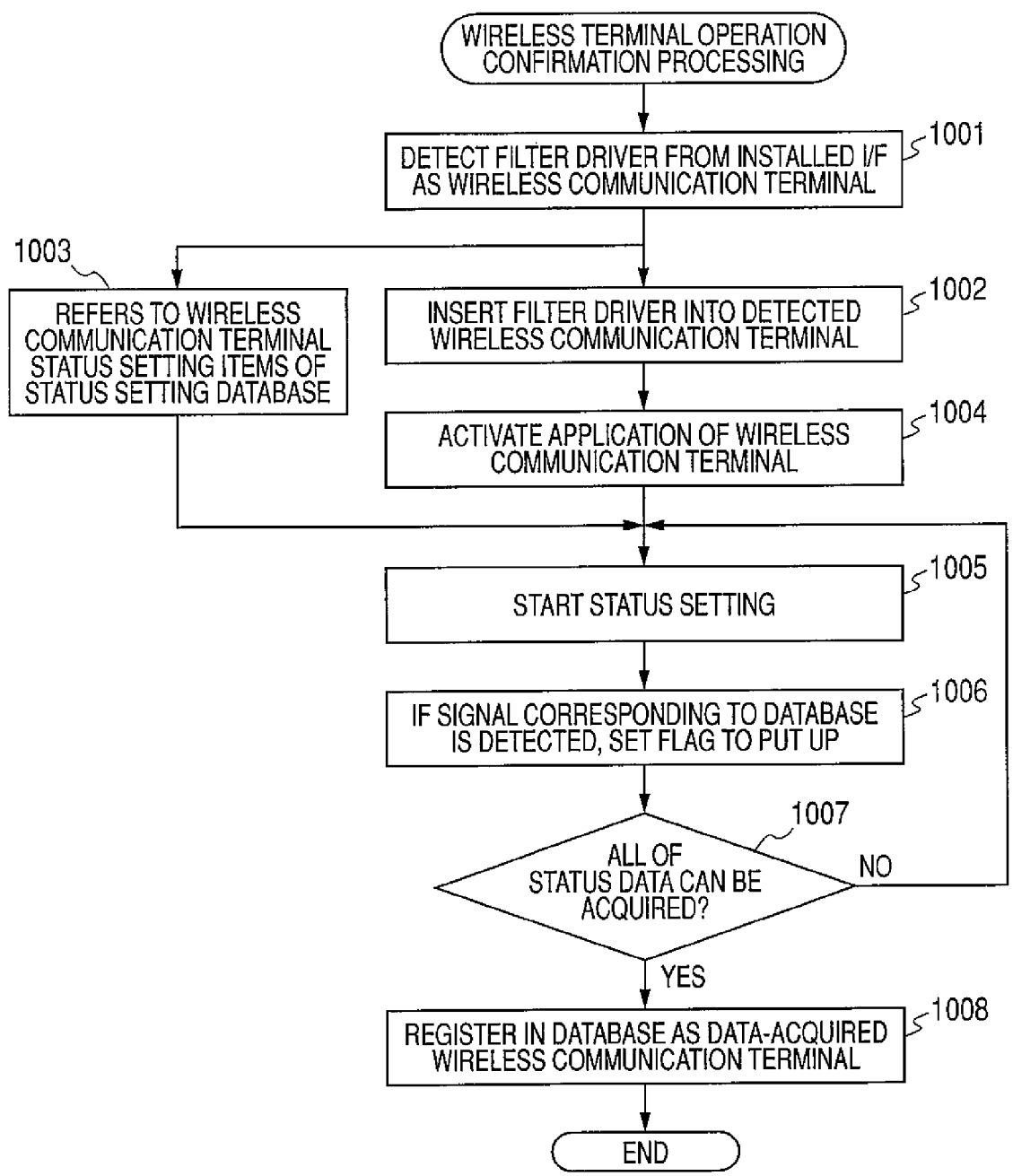
FIG. 13 is a flowchart of a wireless communication terminal operation confirmation processing at Step 412 shown in FIG. 5.

Although this flowchart is applied to a case where the status cannot be discriminated, as shown in FIG. 13, when an external device to be used, such as a wireless communication terminal, can be recognized, measurement is performed on the basis of a status setting database. In addition, the same is applied to a case the status setting database is received from the external device when being connected.

FIG. 13 is a flowchart of a wireless communication terminal operation confirmation processing at Step 412 shown in FIG. 5.

At Step 1001, the filter driver detects that an external device, which is inserted into the I/F connecting section 107, is a wireless communication terminal.

Next, a filter driver is inserted into the wireless communication terminal detected at Step 1002. At Step 1004, the application is activated to perform status setting.

At Step 1001, since the external device can be discriminated as the wireless communication terminal, the wireless communication terminal status setting items of the status setting database are referred to. In addition, if status setting data is received from the connected wireless communication terminal, at Step 1003, the status setting database for the wireless communication terminal may be referred to.

At Step 1005, the database is referred to on the basis of the processing at Step 1003, and status setting starts. At Step 1006, a flag is set to enter a value in the database. The data is acquired on the basis of the flag.

At Step 1007, it is confirmed whether or all of the data can be acquired. If the data can be acquired, at Step 1008, the registration in the database is completed. If the data cannot be acquired, the process returns to Step 1005, and then the processing is repeated.

Next, the wireless terminal schedule processing will be described.

Figure 14:
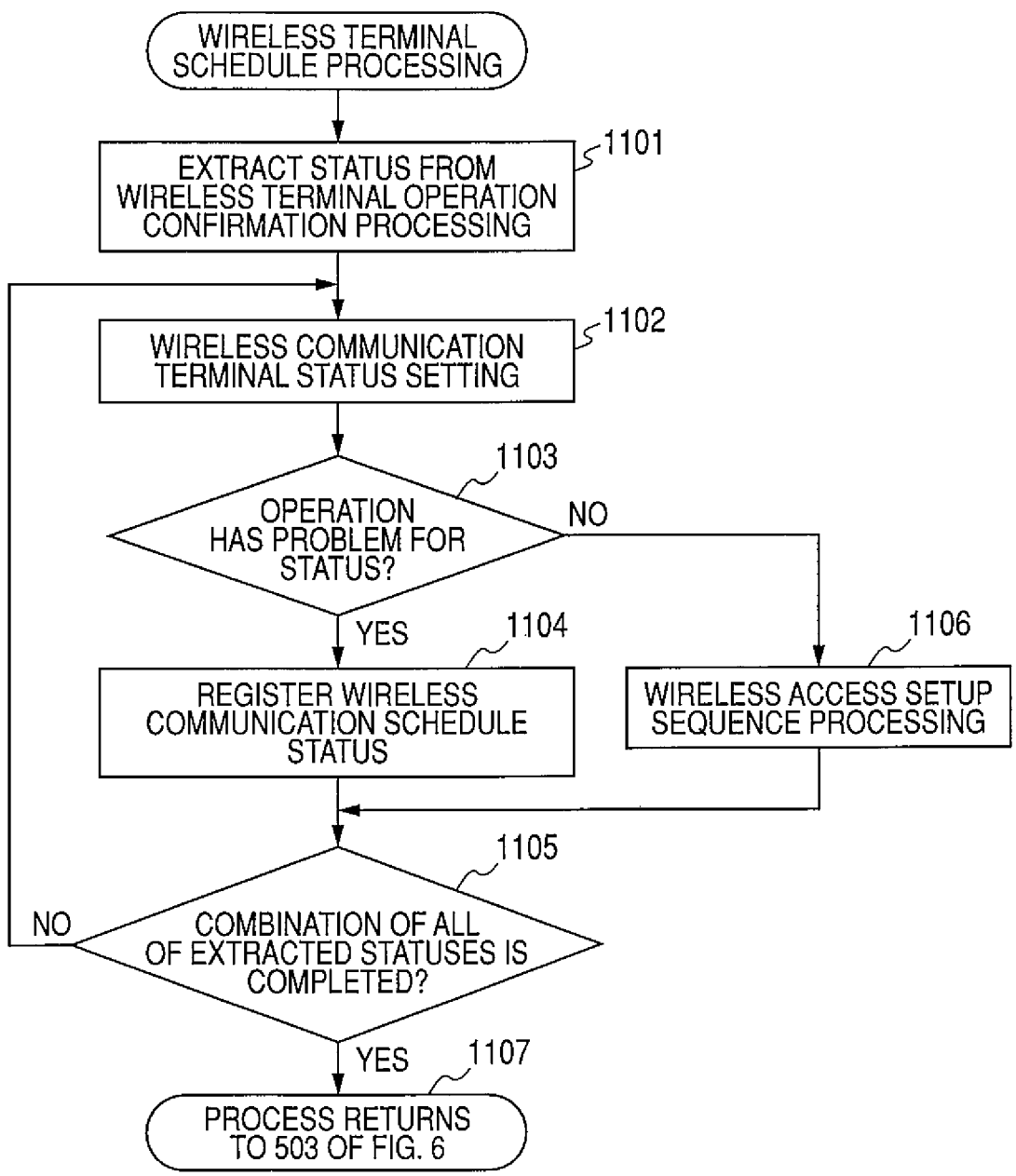
FIG. 14 is a flowchart of a wireless terminal schedule processing according to this embodiment.

FIG. 14 is a flowchart of a wireless terminal schedule processing according to this embodiment.

At Step 1101, status data is extracted from the wireless terminal operation confirmation processing at Step 412 shown in FIG. 5. Next, at Step 1102, the statuses of the wireless communication terminal are combined.

At Step 1103, it is determined whether or not each status has a problem during the simultaneous operation. If each status has no problem, at Step 1104, the statuses are registered in the database as statuses 1 to n, respectively. If it is determined at Step 1105 that the combination of all statuses is completed, at Step 1107, the process progresses to Step 503 shown in FIG. 6.

If it is determined at Step 1103 that the statuses have a problem during the simultaneous operation, at Step 1106, a wireless access setup sequence processing is performed. Then, the output result of Step 1106 is fed back to Step 1105.

Next, a processing in the wireless access setup processing section 116 will be described.

Figure 15:
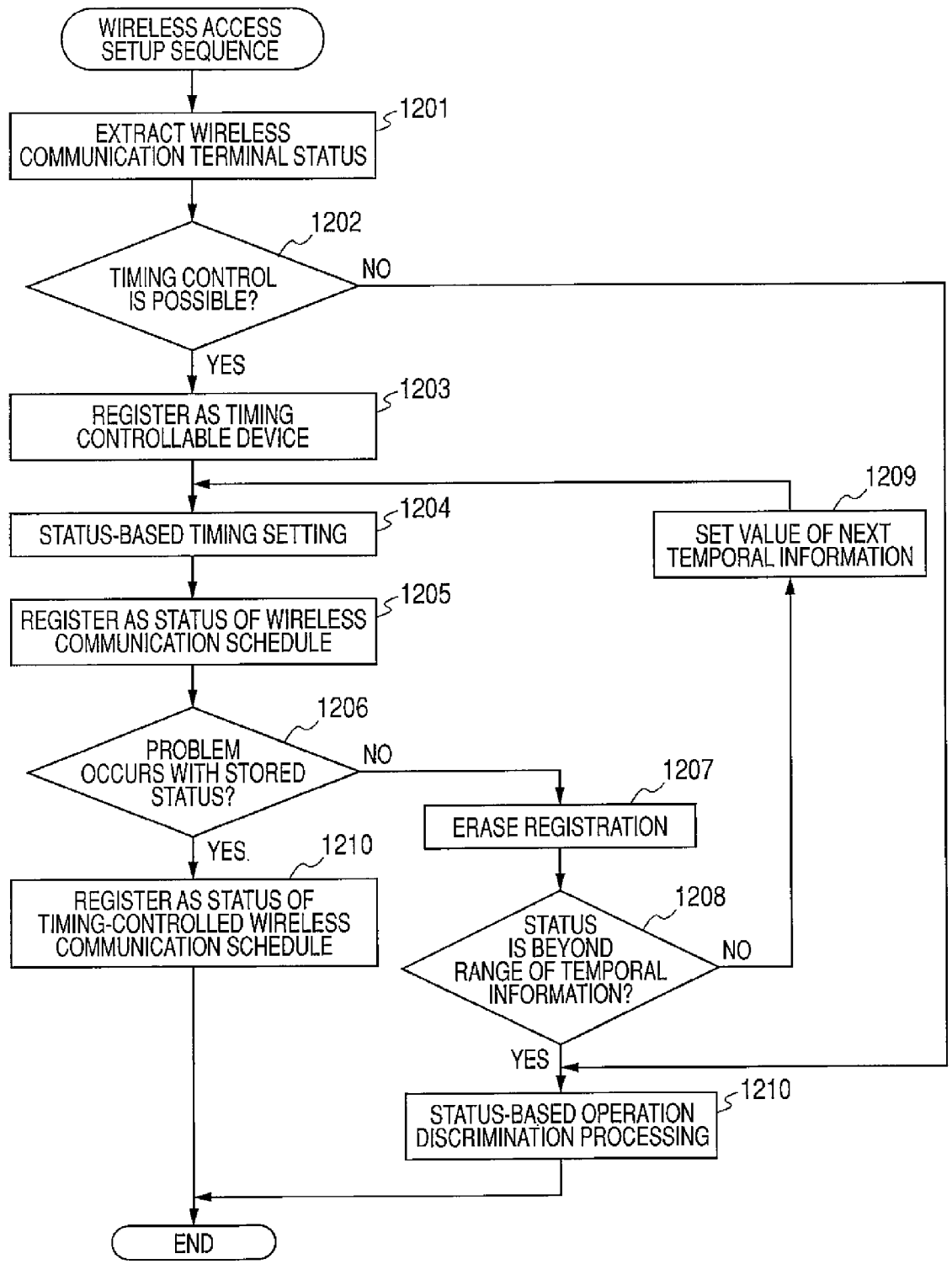
FIG. 15 is a flowchart a wireless access setup sequence according to this embodiment.

FIG. 15 is a flowchart a wireless access setup sequence according to this embodiment.

At Step 1201, the status of the wireless communication terminal is extracted. At Step 1202, for each wireless communication terminal, it is confirmed whether or not temporal data to be timing-controlled is registered.

When the temporal data exists, at Step 1203, the corresponding wireless communication terminal is registered as a timing-controllable device. With the registered data, at Step 1204, during status-based timing setting, status-based timing is set on the basis of temporal information. At Step 1205, the status is temporarily stored as a schedule, and at Step 1206, it is confirmed whether or not the stored status has a problem, similarly to Step 1103 of FIG. 14.

If no problem is present, the status is valid, and at Step 1211, it is registered as a status of a timing-controlled wireless communication schedule. If a problem is present, at Step 1207, the registered data is erased, and at Step 1208, it is confirmed whether or not the status is beyond the movement range of the temporal information. If the status is not beyond the movement range of the temporal information, at Step 1209, the value of next temporal information is set, and the process returns to status-based timing setting at Step 1204.

If it is determined at Step 1202 that timing control is impossible or if it is determined at Step 1208 that the status is beyond the setup of the temporal information, at Step 1210, a status discrimination processing is performed, and then the process returns to the wireless terminal schedule processing. This status is registered as a limited wireless communication schedule or an unusable wireless communication schedule.

Next, a processing in the resource detecting section 109 will be described.

Figure 16:
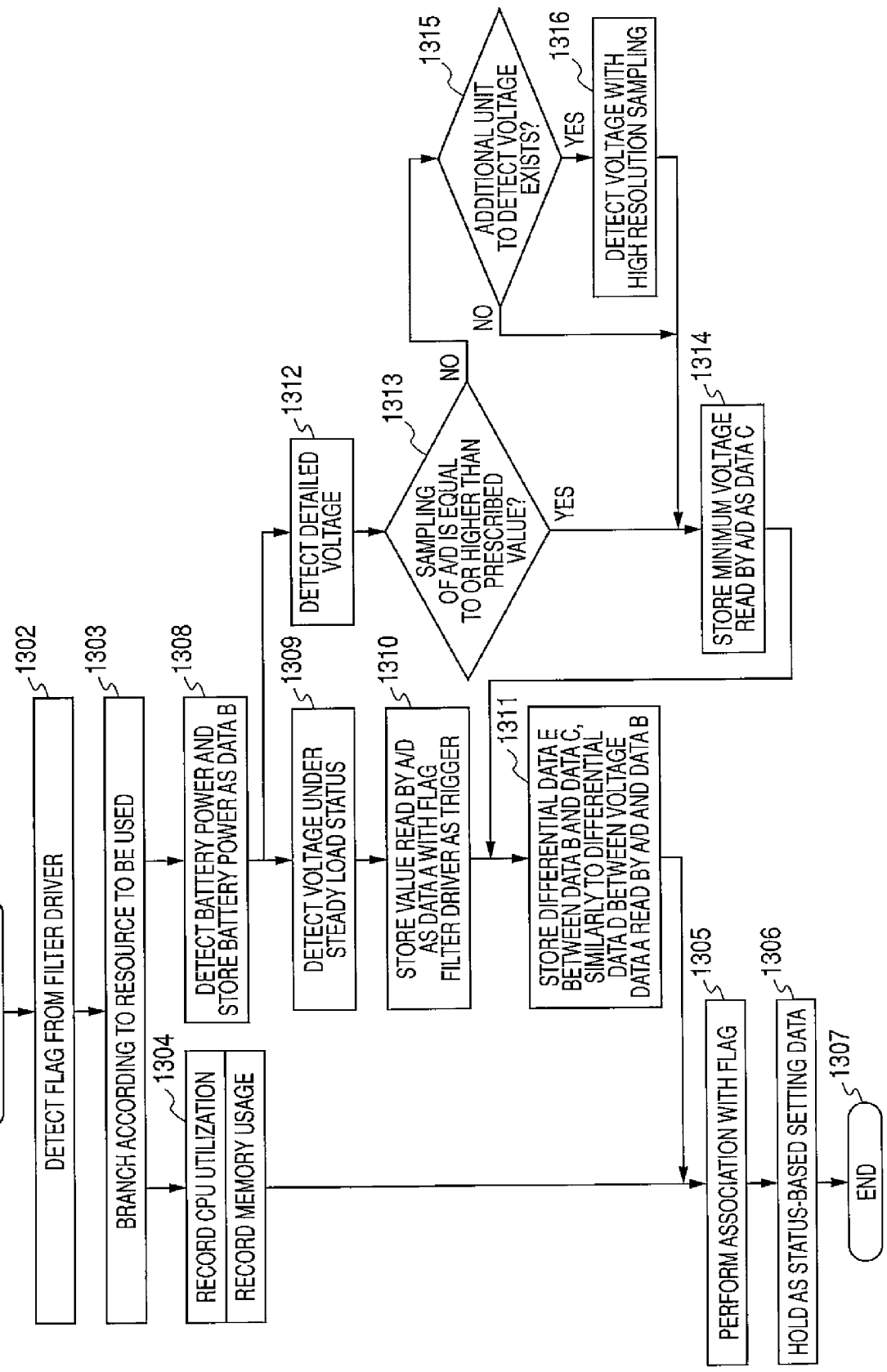
FIG. 16 is a flowchart of a processing in a resource detecting section according to this embodiment.

FIG. 16 is a flowchart of a processing in a resource detecting section according to this embodiment.

A resource, such as the usage of the CPU or the memory, is usually prepared in an execution file of the OS, and the user executes that command to easily examine the resource. However, when other resources are used, the processing needs to be performed.

FIG. 16 is a flowchart showing a case where a power supply voltage is used as a resource.

At Step 1301, the resource is detected. The detected values are processed as data of each status. Accordingly, as the resource, any specification may be used insofar as it is a resource related to a control, such as memory usage and CPU utilization, including a power supply voltage and a current in this example.

At Step 1302, a flag from a filter driver is confirmed. At Step 1303, a processing branches off according to the target resource. At Step 1304, data on the CPU utilization or the memory usage is recorded. At Step 1305, the stored data is associated with the flag. At Step 1306, the associated data is stored as the status-based setting data. Step 1308 is a processing when a battery is used as a resource.

At Step 1308, the battery power at present is stored as data B. In regards to a value to be detected as a voltage, it is necessary to acquire data in a steady load as a static characteristic at Step 1309 and a dynamic load as an inrush at Step 1312. At Step 1309, a voltage in the steady load is detected. Here, a value that is used in battery display is used. At Step 1310, a difference between data A read by an analog/digital (A/D) converter and the data B at Step 1308 is stored in association with the flag of the status.

Here, it is confirmed which is associated with the stored data, and if the data is associated with a resource other than the battery, another resource at Step 1304 is stored as original data. At Step 1305, in detecting a detailed voltage, that is, an inrush, at Step 1312, first, it is determined the performance of the A/D converter. At Step 1313, for example, the performance of an A/D converter is determined at a sampling rate of 100 kHz.

When the sampling frequency of the A/D converter is equal to or higher than a prescribed value, at Step 1314, a voltage is measured with the flag as a trigger. At Step 1313, when the sampling frequency of the A/D converter is low, it is searched whether or not an additional unit for detecting a voltage exists. When the additional unit does not exist, the processing of Step 1314 is performed by the existing A/D converter. When the additional unit exists, a voltage is detected by an A/D converter of high resolution sampling, and the processing of Step 1314 is performed.

The above-described sequences will be described with reference to the drawings.

In this embodiment, a voltage is used as a resource.

Figure 17:
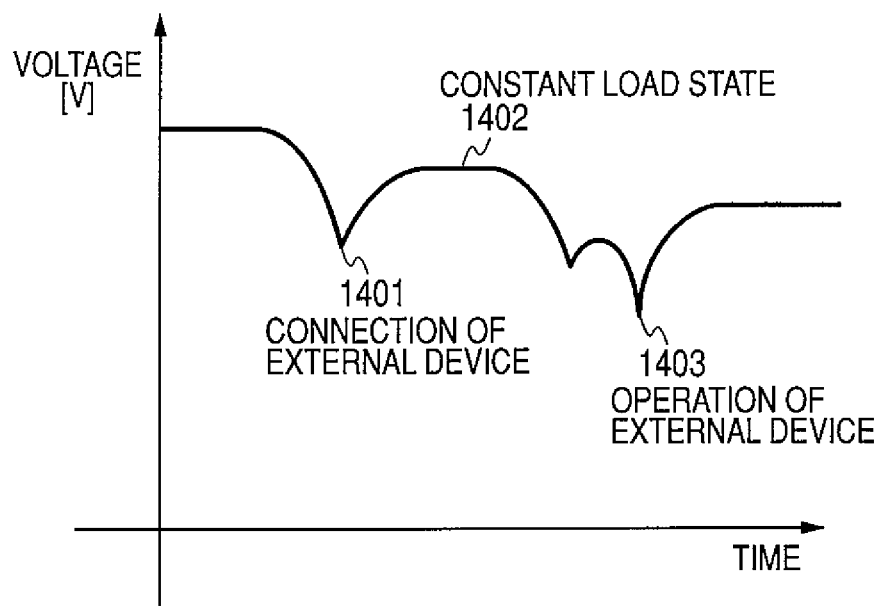
FIG. 17 is a diagram showing a voltage measurement example according to this embodiment.

FIG. 17 is a diagram showing a voltage measurement example according to this embodiment.

Figure 18:
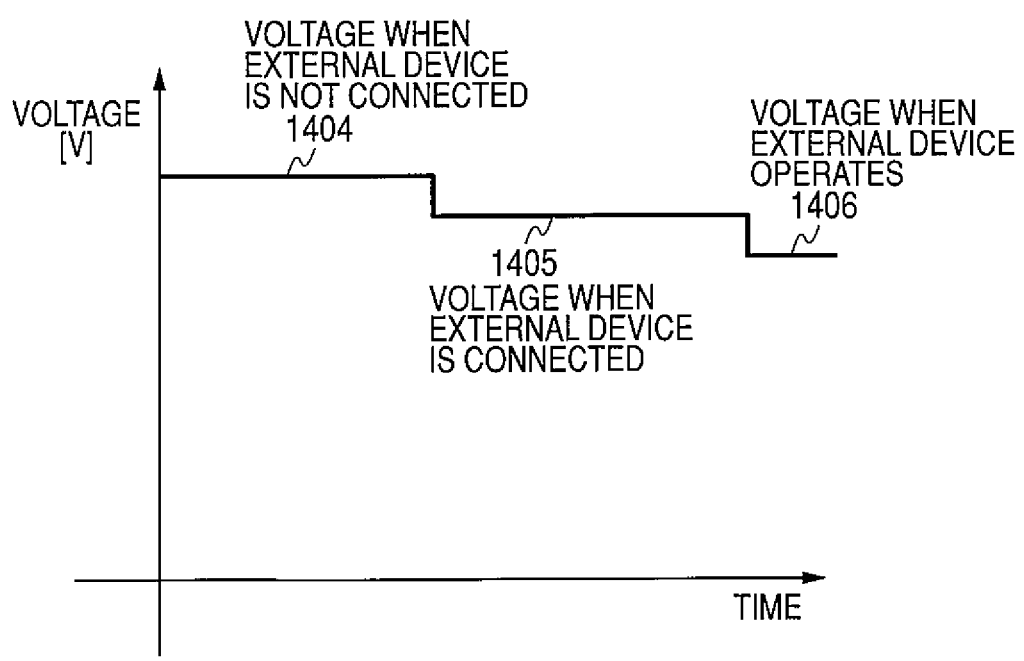
FIG. 18 is a diagram showing voltages in a disconnection state, a connection state, and an operation state of an external device according to this embodiment.

FIG. 18 is a diagram showing voltages in a disconnection state, a connection state, and an operation state of an external device according to this embodiment.

Usually, when an external device is connected or when a circuit operates, voltage drop occurs, similarly to, in FIG. 17, when an external device is connected, as indicated by reference numeral 1401 or when an external device operates, as indicated by reference numeral 1403 in FIG. 17.

However, these values are transient values, but the value to be used as the battery power is a value in a constant load when an operation is stable, such as a voltage when an external device is not connected, as indicated by reference numeral 1404 in FIG. 18.

At Step 1309 in FIG. 16, in regards to the voltage as the static characteristic, the value of a voltage when an external device is not connected, as indicated by reference numeral 1404 in FIG. 18, or the value of a voltage when an external device, as indicated by reference numeral 1405 and the value of a voltage when an external device operates are stored as the data B. In addition, for the wireless communication terminal, the same voltage processing is performed.

Figure 19:
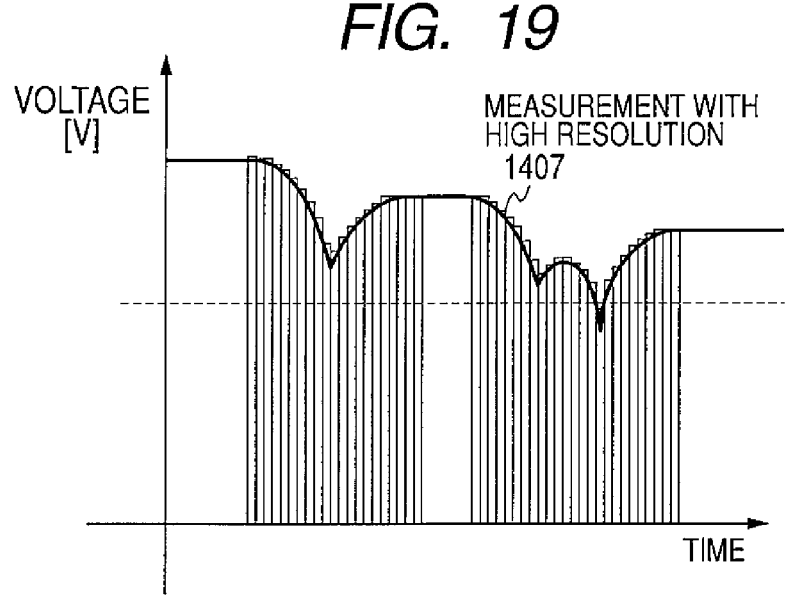
FIG. 19 is a diagram showing a detailed voltage detection example at Step 1312 shown in FIG. 16.

FIG. 19 is a diagram showing a detailed voltage detection example at Step 1312 shown in FIG. 16.

If the sampling frequency of the A/D converter is set to high resolution, as indicated by reference numeral 1407 in FIG. 19, a dropped voltage can be detected. The minimum voltage at that time becomes a dropped minimum voltage. The status data is based on the difference between the data.

The wireless terminal operation confirmation processing associated with FIG. 10 will be described by way of the resource detection.

Figure 20:
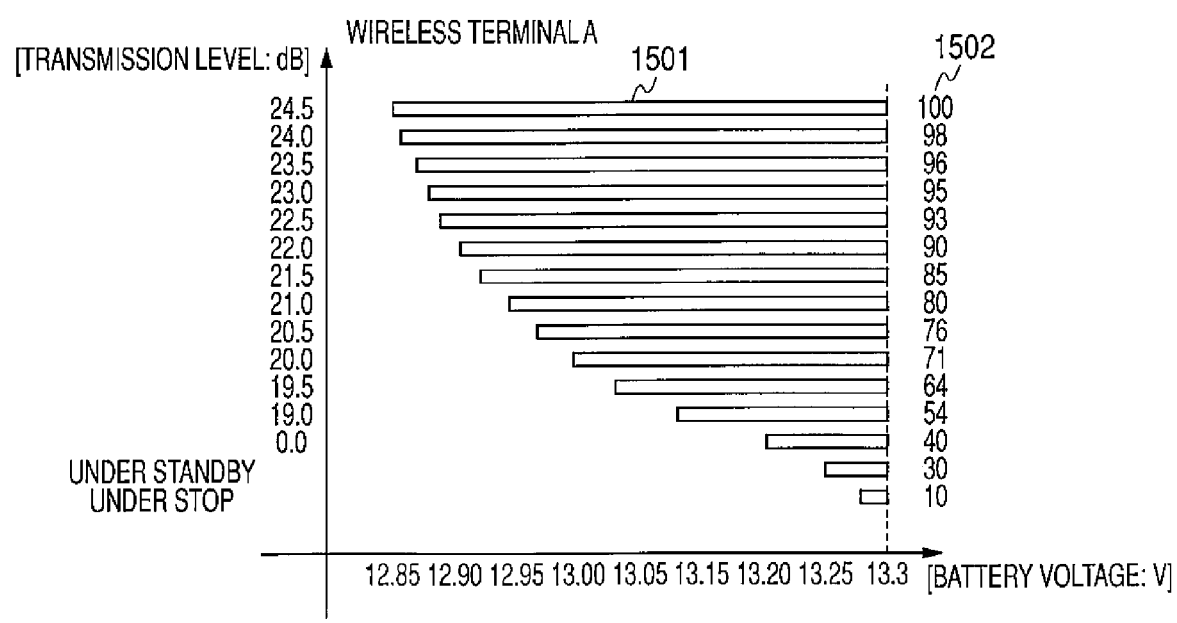
FIG. 20 is a diagram showing a measurement example when a transmission control is performed in a wireless communication terminal A.

FIG. 20 is a diagram showing a measurement example when a transmission control is performed in a wireless communication terminal A.

Figure 21:
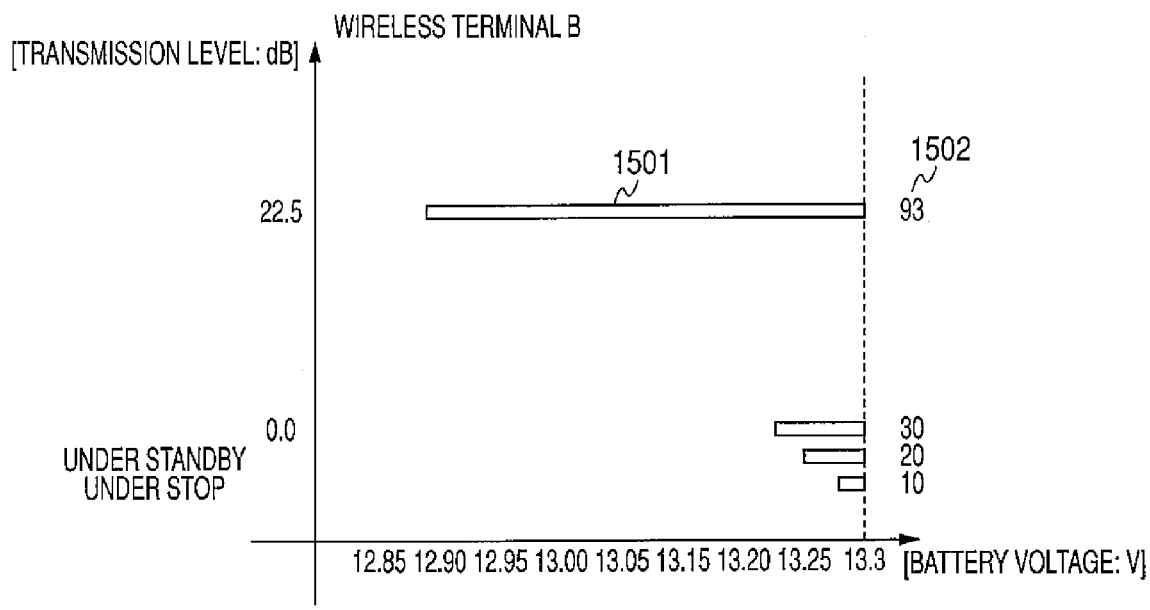
FIG. 21 is a diagram showing a measurement display when a transmission control is not performed in a wireless communication terminal B.

FIG. 21 is a diagram showing a measurement display when a transmission control is performed in a wireless communication terminal B.

Figure 22:
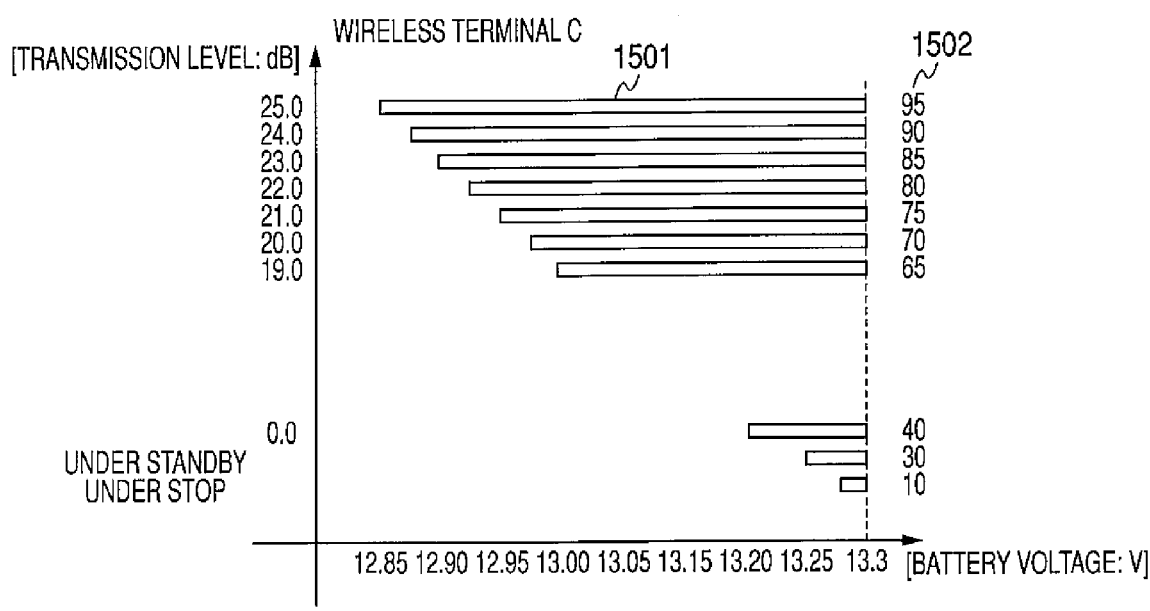
FIG. 22 is a diagram showing a measurement example when a transmission control is performed in a wireless communication terminal C.

FIG. 22 is a diagram showing a measurement example when a transmission control is performed in a wireless communication terminal C.

Here, the vertical axis represents the transmission level or the status of the wireless communication terminal, such as under standby or under stop, and the horizontal axis represents the voltage value of the battery.

In FIGS. 20 and 22 that show the measurement data of the wireless communication terminals A and C, respectively, reference numeral 1501 represents a different between the battery voltage and a voltage dropped in each status, and reference numeral 1502 represents a voltage difference as status data in an integer value.

Since the wireless communication terminal B is not under the transmission control, each operation status becomes data.

Figure 23A:
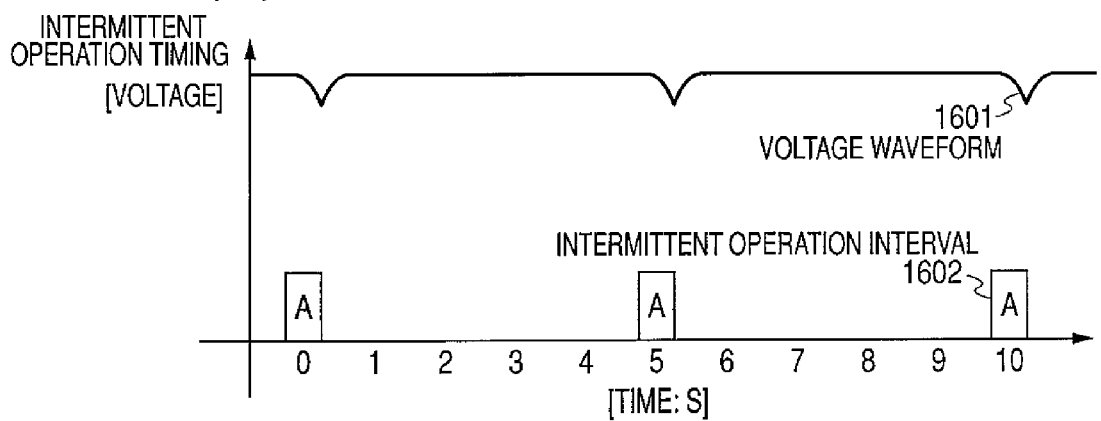
FIG. 23(A) is a diagram showing timing setting data of the wireless communication terminal A.
Figure 23B:
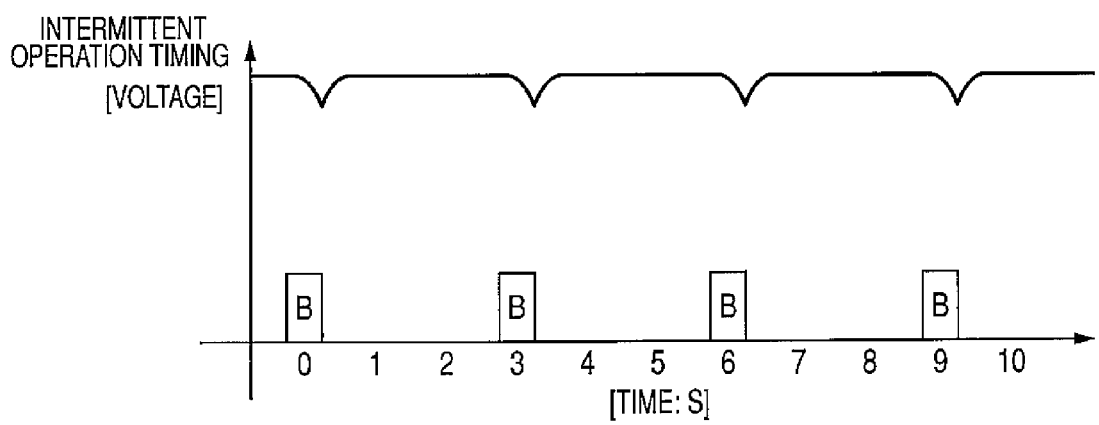
FIG. 23(B) is a diagram showing timing setting data of the wireless communication terminal B.
Figure 23C:
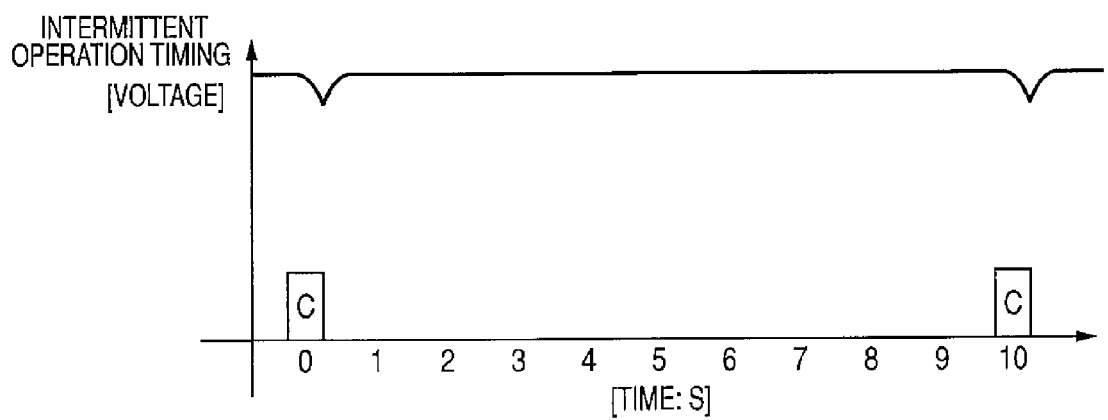
FIG. 23(C) is a diagram showing timing setting data of the wireless communication terminal C.

FIGS. 23(A) to 23(C) are diagrams showing timing setting data of the wireless communication terminals A, B, and C. Specifically, FIG. 23(A) shows timing setting data of the wireless communication terminal A. FIG. 23(B) shows timing setting data of the wireless communication terminal B. FIG. 23(C) shows timing setting data of the wireless communication terminal C.

In addition to the wireless communication terminal, a device of a kind may perform an intermittent operation, and in the wireless communication terminal, an ON/OFF communication operation occurs as a standby status.

In regards to the ON/OFF operations as the standby status of the wireless communication terminals A to C of FIGS. 20 to 22, FIG. 23(A) shows the standby operation of the wireless communication terminal A, FIG. 23(B) shows the standby operation of the wireless communication terminal B, and FIG. 23(C) shows the standby operation of the wireless communication terminal C.

In FIG. 23(A), reference numeral 1601 represents a voltage waveform, and reference numeral 1602 represents an intermittent operation interval of the wireless communication terminal. As indicated by reference numeral 1601, a voltage drops at the timing when the voltage waveform corresponds to transmission ON.

FIG. 24 is a diagram illustrating a standalone operation confirmation processing in FIG. 12 when an external device is a CD-R drive.

In FIG. 24, through the standalone operation confirmation processing shown in FIG. 12, as indicated by reference numeral 1701 in the vertical axis, an execution status is extracted from the flag, which is detected from a disc drive by the filter driver. Though actually recorded as the status, the status is defined as an execution name. In FIG. 24, the horizontal axis represents the voltage value of the battery. The execution status indicated by reference numeral 1701 becomes a difference between the battery voltage and the voltage dropped in each status, and as indicated by reference numeral 1702, the voltage difference as status data is represented in an integer value.

Figure 26:
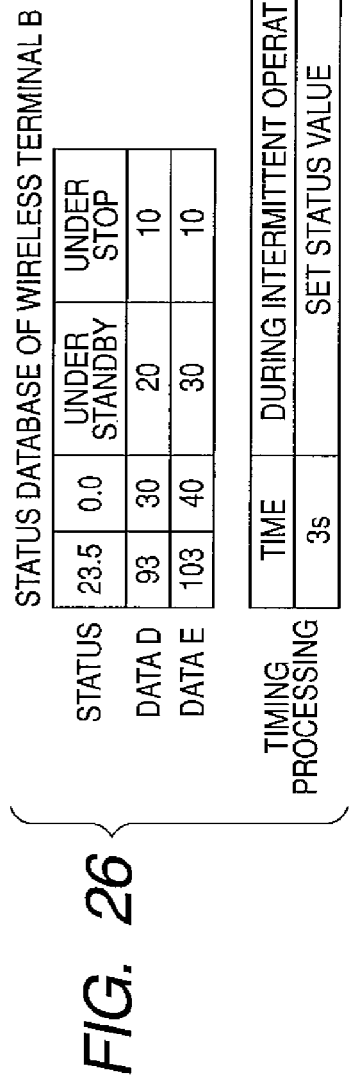
FIG. 26 is a diagram showing status data of the wireless communication terminal B.
Figure 27:
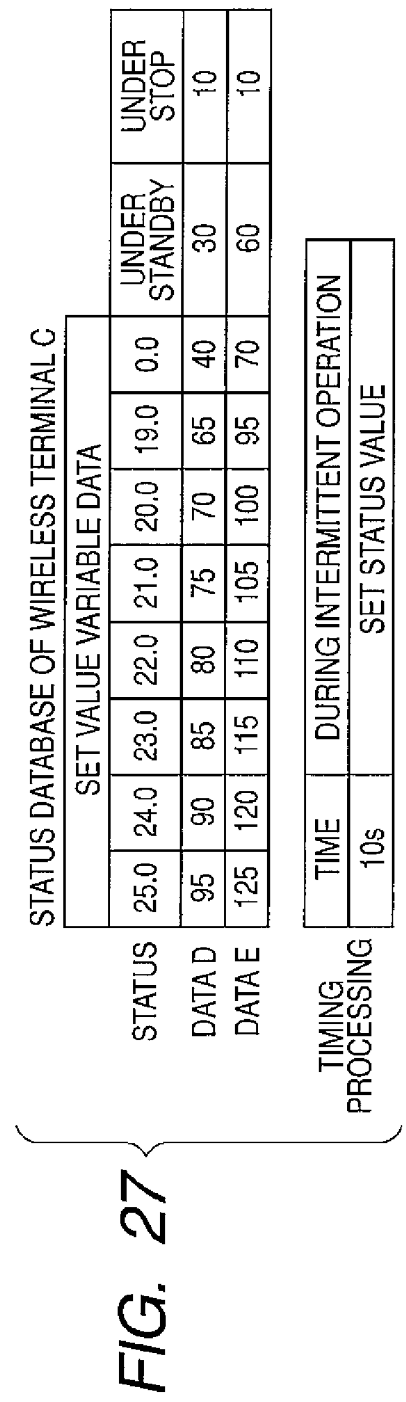
FIG. 27 is a diagram showing status data of the wireless communication terminal C.
Figure 28:
FIG. 28 is a diagram showing status data of the CD-R drive.

FIGS. 25 to 28 are diagrams showing status data of the individual devices. Specifically, FIG. 25 is a diagram showing status data of the wireless communication terminal A. FIG. 26 is a diagram showing status data of the wireless communication terminal B. FIG. 27 is a diagram showing status data of the wireless communication terminal C. FIG. 28 is a diagram showing status data of the CD-R drive.

Here, FIG. 28 does not include timing processing data. This is because the control depends on the OS, and thus the operation is optimized.

Meanwhile, in a wireless communication terminal that does not depend on the OS, a problem may occur ON/OFF timing, and thus the timing processing data is required.

Figure 29:
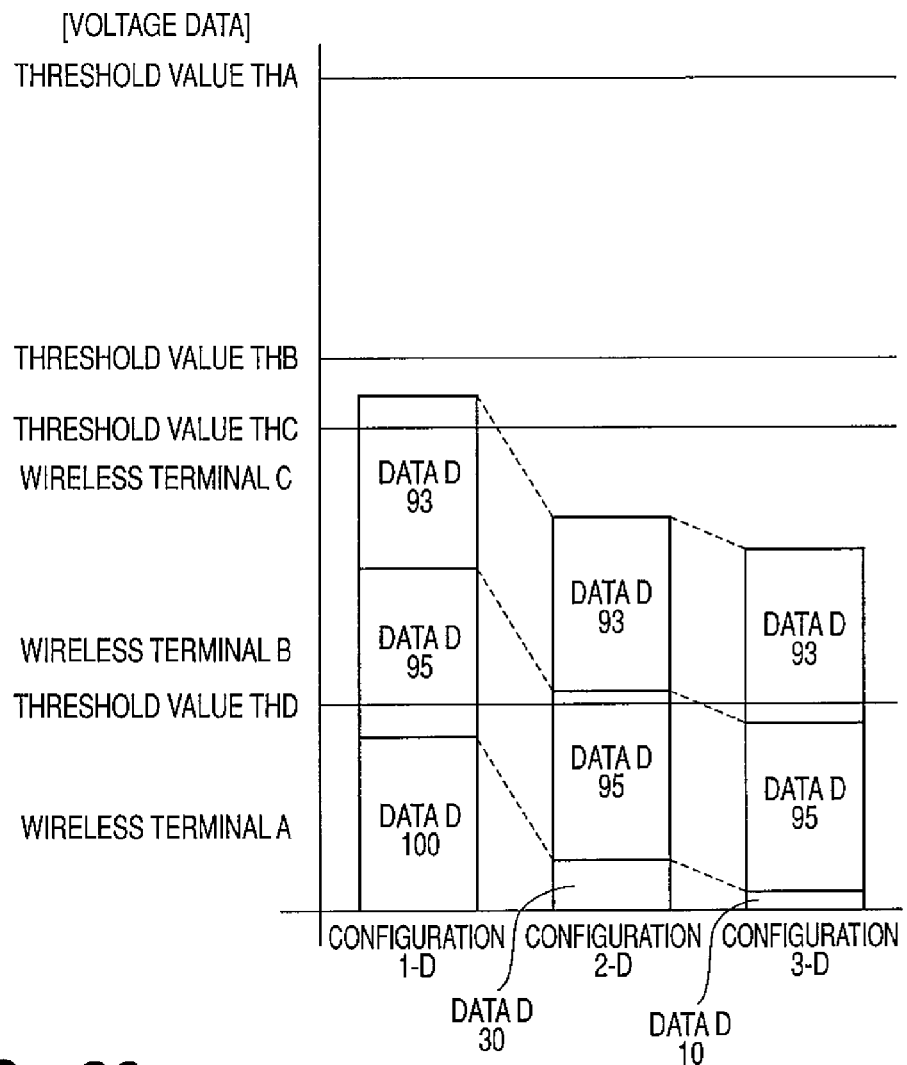
FIG. 29 is a diagram showing an example of a wireless terminal schedule processing, in which configuration data is created on the basis of status data of each wireless communication terminal.
Figure 30:
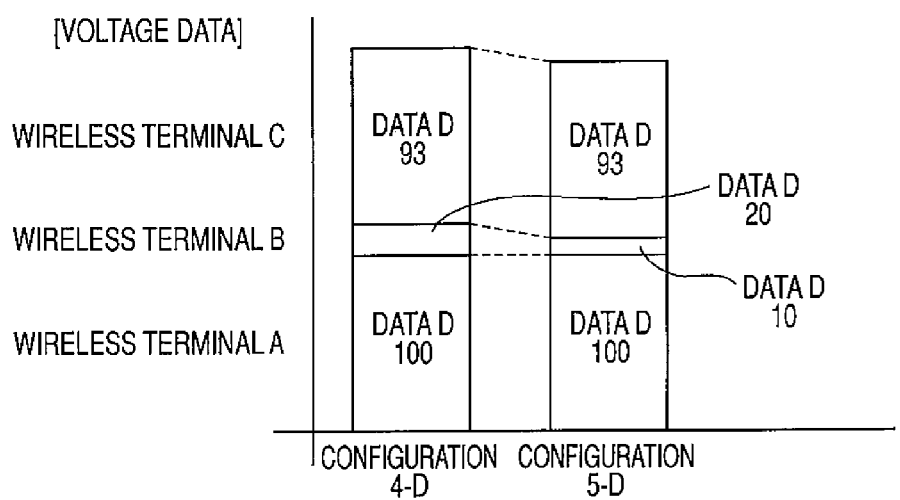
FIG. 30 is a diagram showing an example of a wireless terminal schedule processing, in which configuration data is created with the status of the wireless communication terminal B as a primary configuration factor.
Figure 31:
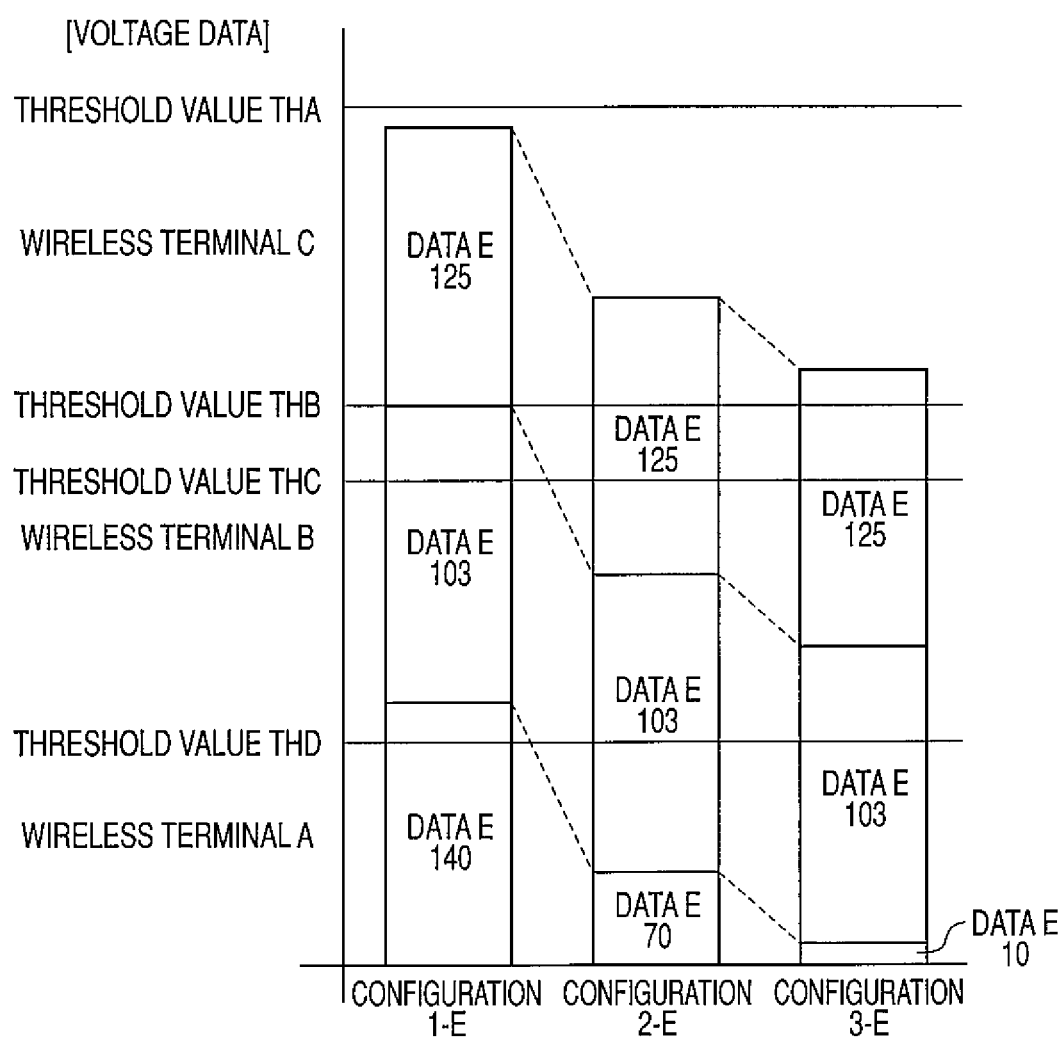
FIG. 31 is a diagram showing an example of a wireless terminal schedule processing, in which configuration data is created with data E as status data.

FIGS. 29 to 31 are diagrams examples of a wireless terminal schedule processing.

FIG. 29 is a diagram showing an example where configuration data is created on the basis of status data of each wireless communication terminal.

FIG. 30 is a diagram showing an example where configuration data is created with the status of the wireless communication terminal B as a primary configuration factor.

FIG. 31 is a diagram showing an example where configuration data is created with data E as status data.

In FIGS. 29 to 31, the vertical axis represents voltage data that is obtained by representing a voltage difference as status data in an integer value, which is the addition result of data per configuration.

A threshold value is obtained by representing a minimum operation voltage in the PC 101 as status data in an integer value.

Moreover, the threshold value used herein is a threshold value of the PC 101, for example, a threshold value of a forced standby voltage of the battery voltage of the PC 101. Since the threshold value itself depends on the battery or the PC, the threshold value varies according to the PC.

Here, as the wireless communication terminal status setting, the configuration by combining the individual statuses is represented.

As described above, in FIG. 29, configuration data is created and formed based on the status data for each wireless communication terminal. FIG. 29 shows an example where configuration data is created with the status of the wireless terminal A as the primary factor of the configuration. Here, in regards to set value variable data, an initial maximum width is used as a constituent element.

FIG. 30 shows an example where configuration data is created with the status of the wireless terminal B as the primary factor of the configuration.

In FIG. 31, data E is used as status data. As will be present in the number example of the constituent element, data D and data E are associated with each other as a configuration 1.

At Step 1103 of FIG. 14, to determine whether or not the operation has a problem depends on whether configuration data exceeds a threshold value indicated by a solid line or not, in the drawing. When the configuration data exceeds the threshold value, it is determined that the operation has a problem.

Here, in case of a threshold value THA of FIG. 30, the operation has no problem.

However, in case of a threshold value THC, the operation has a problem.

In regards to a threshold value THB, it is determined that a problem is not present in FIG. 29, but a problem is present in FIG. 31. For this reason, with respect to a configuration 1-D, a configuration 2-D, and a configuration 3-D associated with the threshold value THB, the wireless access setup sequence is applied.

Figure 32:
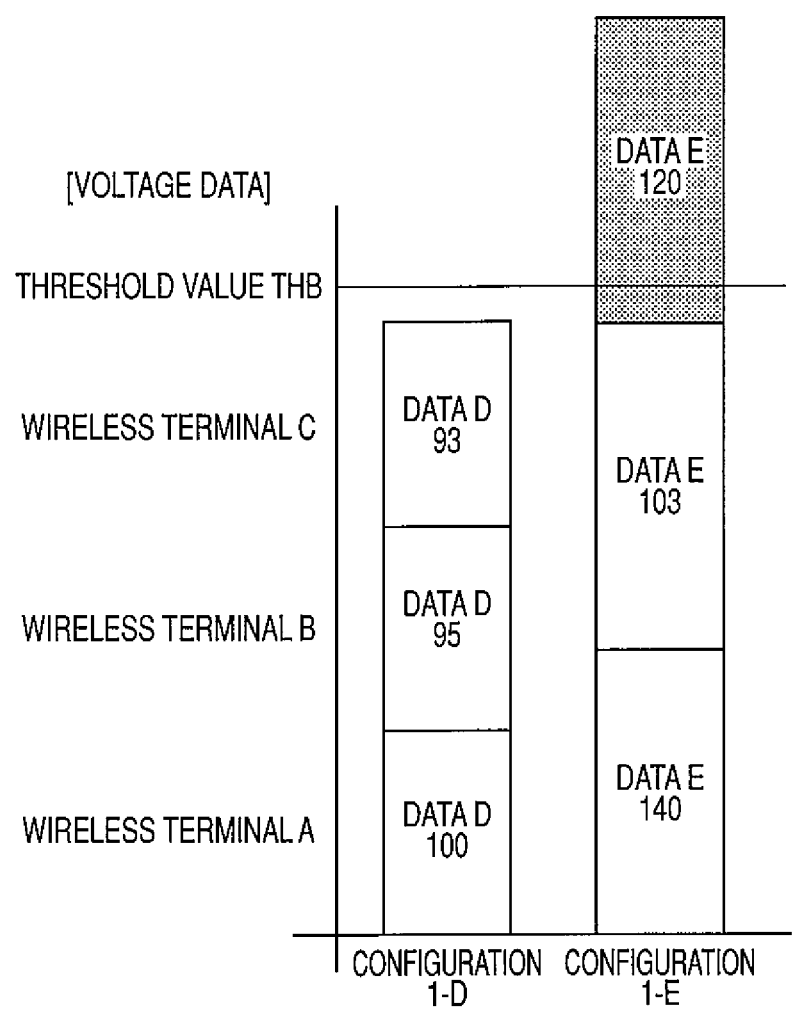
FIG. 32 is a diagram showing a wireless access setup sequence.

FIG. 32 is a diagram showing a wireless access setup sequence.

In FIG. 32, the vertical axis represents voltage data that is obtained by representing a voltage difference created as status data in an integer value, which represents the addition result of data per configuration. As described above, the threshold value is obtained by representing a minimum operation voltage in the PC 101 as status data in an integer value. Moreover, the threshold value used herein is a threshold value of the PC 101, for example, a threshold value of a forced standby voltage of the battery voltage of the PC 101. Since the threshold value itself depends on the battery or the PC, the threshold value varies according to the PC.

FIG. 32 shows configuration data of the configuration 1-D and the configuration 1-E shown in FIG. 29. For example, a case where a problem is present in regards to the threshold value THB will be described.

In the configuration 1-D, it is determined that no problem is present. Meanwhile, in the associated configuration 1-E, a problem is present, and the wireless terminal C cannot operate simultaneously from the threshold value. In regards to the branch of timing control at Step 1202 of FIG. 15, timing control can be performed when the status setting databases of FIGS. 25 to 28 have timing processing data.

Figure 33A:
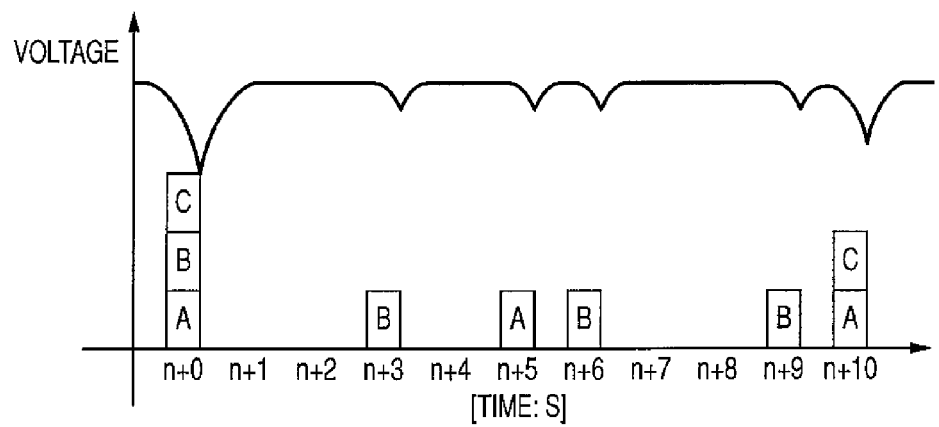
FIG. 33(A) is a diagram showing timing setting for a plurality of wireless communication terminals.
Figure 33B:
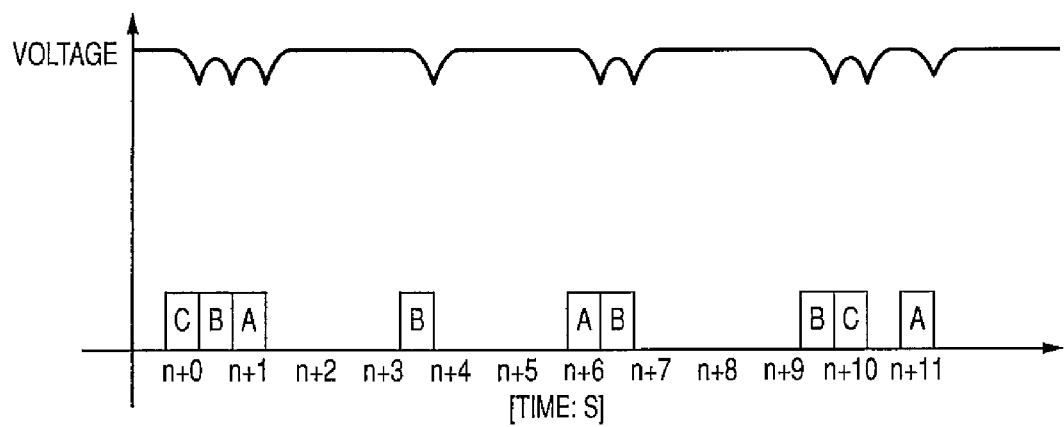
FIG. 33(B) is a diagram showing timing setting for a plurality of wireless communication terminals.
Figure 33C:
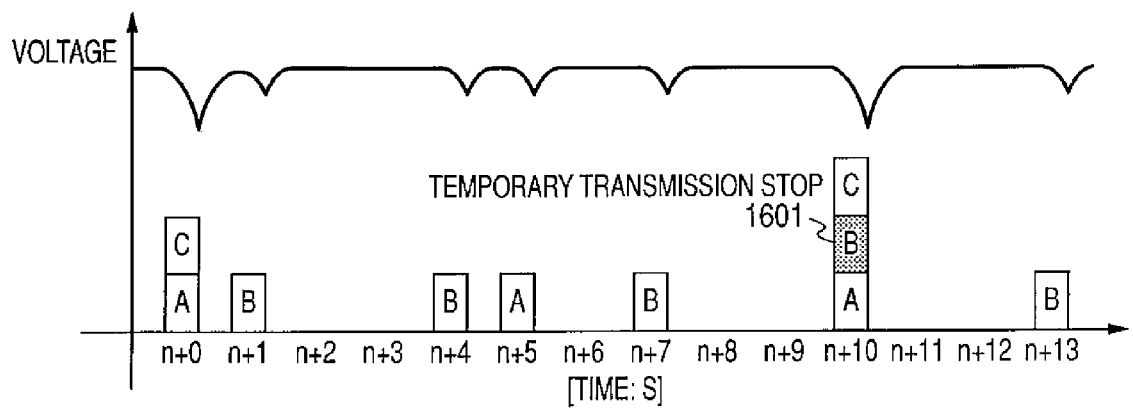
FIG. 33(C) is a diagram showing timing setting for a plurality of wireless communication terminals.

FIGS. 33(A) to 33(C) are diagrams showing timing setting for a plurality of wireless communication terminals. Specifically, FIG. 33(A) is a diagram an intermittent operation interval of each of the wireless terminals A to C when they operate simultaneously and a voltage at that time. FIG. 33(B) is a diagram showing a case where timing setting under timing control 1 is performed, and FIG. 33(C) is a diagram showing a case where timing setting under timing control 2 is performed.

In FIG. 33(A), timing control is performed.

In FIG. 33(B), the timing setting under the timing control 1 is performed. At this time, however, a case where the wireless communication terminals A, B, and C simultaneously operate is excluded. Accordingly, an intermittent operation from an initial activation operation is set such that the wireless communication terminal B is shifted by 0.5 second (s) with respect to the wireless communication terminal C, and is shifted by 1 second (s) with respect to the wireless communication terminal A.

In FIG. 33(C), the timing setting under the timing control 2 is performed. In this case, however, at the timing 1601 when simultaneous activation is performed, the transmission of the wireless communication terminal B is stopped. Accordingly, only the wireless communication terminal A and the wireless communication terminal C operate at the same timing.

In regards to the timing setting, the operation of a wireless communication terminal having a long intermittent operation interval is fixed, and the operations of other wireless terminals are set.

In FIGS. 33(A) to 33(C), when the problem is not resolved by the timing setting, or when the status is beyond the temporal information, and the timing setting is impossible, the status discrimination processing is performed.

Figure 34:
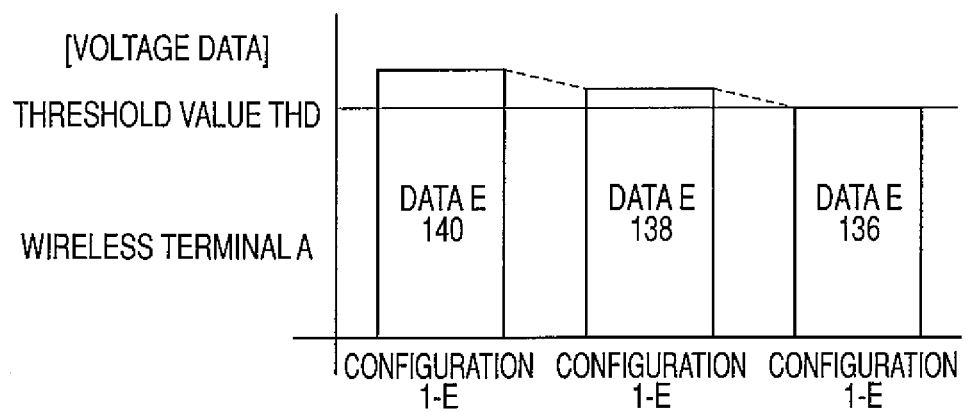
FIG. 34 is a diagram showing an example of a wireless terminal schedule processing when setting is performed using status discrimination and illustrating a case where, after timing setting, a standalone operation is impossible.
Figure 35:
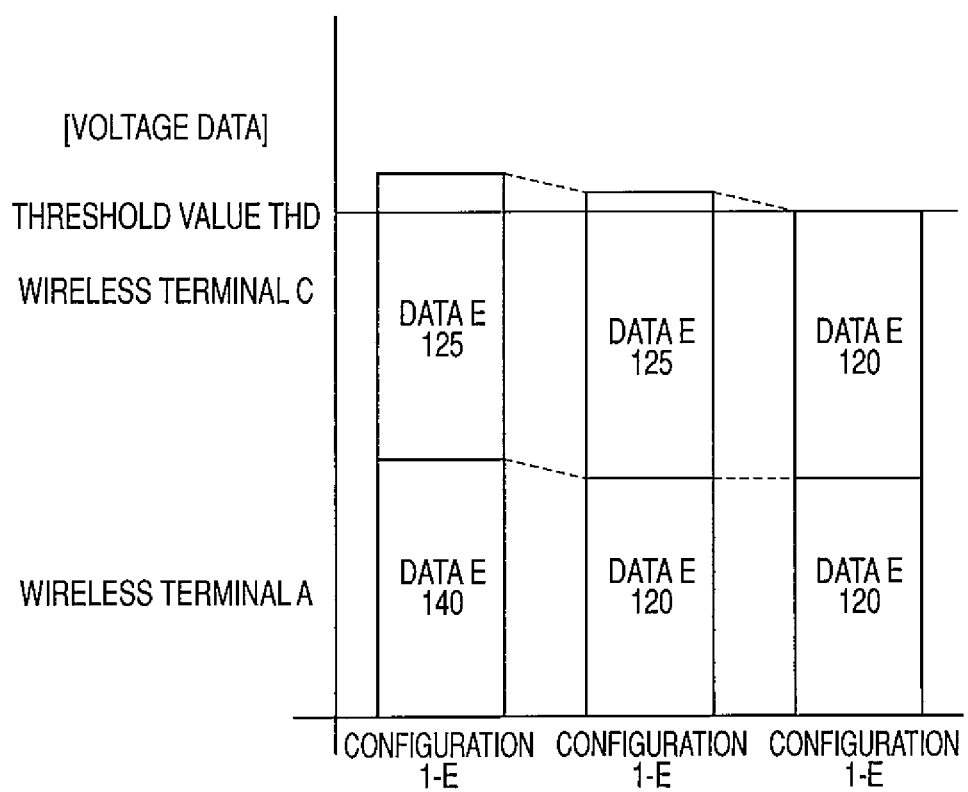
FIG. 35 is a diagram showing an example of a wireless terminal schedule processing when setting is performed using status discrimination and illustrating a case where a plurality of set value variable data exist.
Figure 36:
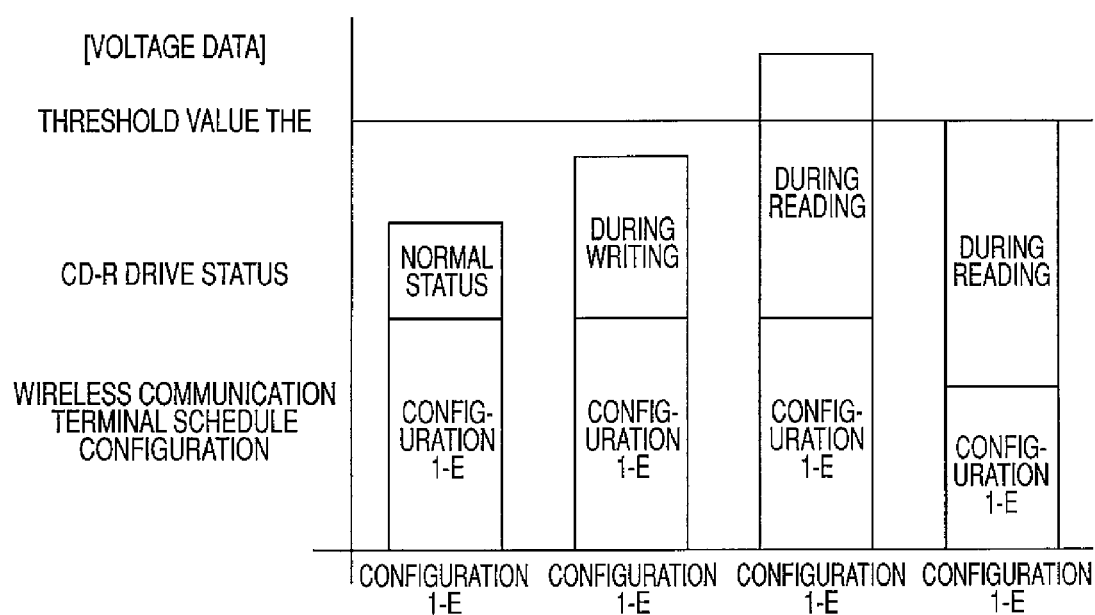
FIG. 36 is a diagram showing an example of a wireless terminal schedule processing when setting is performed using status discrimination and illustrating the configurations of all devices to be connected.

FIGS. 34 to 36 are diagrams showing examples of a wireless terminal schedule processing when setting is performed using status discrimination. Specifically, FIG. 34 is a diagram illustrating a case where, after timing setting, a standalone operation is impossible. FIG. 35 is a diagram illustrating a case where a plurality of set value variable data exist. FIG. 36 is a diagram illustrating the configurations of all devices to be connected.

In FIGS. 34 to 36, the vertical axis represents voltage data that is obtained by representing a voltage difference created as status data in an integer value, which represents the addition result of data per configuration. As described above, the threshold value is obtained by representing a minimum operation voltage in the PC 101 as status data in an integer value. Moreover, the threshold value used herein is a threshold value of the PC 101, for example, a threshold value of a forced standby voltage of the battery voltage of the PC 101. Since the threshold value itself depends on the battery or the PC, the threshold value varies according to the PC.

Like the threshold value THD in FIG. 29 or 31, in the standalone wireless communication terminal, the configuration data may exceed the threshold value. In this case, the set value is decreased with the set value variable data according to the configuration data after the timing setting.

In FIGS. 33(A) to 33(C), when the standalone operation is impossible after the timing setting, a variable value from the set value variable data is decreased such that the configuration data falls within the threshold value.

FIG. 35 shows a case where a plurality of set value variable data exist, as described above.

In this case, for the data E of the wireless communication terminal A, the set value is decreased, and in the wireless communication terminal C, the set value variable data is large. Accordingly, the set value of the wireless communication terminal C is decreased so as to fall within the threshold value.

FIG. 36 shows the configurations of all of the devices to be connected.

In the foregoing method, the statuses and configurations as the schedule of the wireless communication terminal are constructed. The status data of the external device is formed per status by the operation registration processing of FIG. 6, as shown in FIG. 36.

The configuration value is given to the status discrimination processing. Here, timing setting data does not exist in the status data of a CD-R drive, and a timing setting function is provided in the constructed wireless communication terminal schedule configuration.

However, since the timing of the wireless communication terminal schedule is completely optimized at present, a timing processing is not performed, the set value is changed from the set value variable data by the status discrimination processing using the set value variable data shown in FIG. 35 such that the configuration data does not exceed the threshold value THE.

As described above, according to this embodiment, the note PC 101 controls the wireless communication terminals 103 and 104 according to the connection status or the operation status of the externally connected device. Accordingly, when unexpected voltage drop or voltage drop due to the connection of the externally connected device occurs, the PC can control the wireless communication terminal, and thus, the control according to the power supply ability of the PC can be performed.

As a result, the limited amount of power of the PC can be effectively used.

The wireless communication terminal does not always perform the maximum output, and power consumption is dynamically changed, for example, under standby or transmission control according to communication quality. Therefore, the standby operation of the wireless communication terminal can be temporarily stopped, and in the interim, data can be written in the storage device.

During the normal use, even if a plurality of wireless communication terminals are provided, the note PC manages the individual wireless communication terminals and shifts the timing when power is transiently consumed, such as maximum transmission. As a result, unexpected power lowering in the PC can be reduced.

This application is based on, and claims priority from, Japanese Patent Application No. 2005-285655, filed on Sep. 29, 2005, the disclosure of which is incorporated by reference herein.

The invention claimed is:

1. A control method of a wireless communication terminal, which is supplied with power through an external device connection terminal to be power-supplied from an electronic apparatus and performs a processing according to a schedule, the method comprising:

changing the schedule, based on:
   a minimum normal value in the electronic apparatus; and
   a temporary voltage drop according to the schedule in the wireless communication terminal.

2. The control method of a wireless communication terminal according to claim 1, wherein, when an external device that is supplied with power using the external device connection terminal is connected to the electronic apparatus, a power supply state of the electronic apparatus is compared with a power consumption state of the external device, and when the comparison result exceeds a prescribed threshold value, the schedule is changed to control such that the comparison result does not exceed the threshold value.

3. The control method of a wireless communication terminal according to claim 1 or 2, wherein configuration data created on the basis of status data of the wireless communication terminal and at least one threshold value are compared with each other.

4. The control method of a wireless communication terminal according to claim 3, wherein, when a plurality of wireless communication terminals are connected to the electronic apparatus, configuration data created on the basis of status data of each wireless communication terminal and the threshold value are compared with each other.

5. The control method of a wireless communication terminal according to claim 4, wherein, when, in a standalone wireless communication terminal, over-threshold occurs, a set value in set value-variable data associated with configuration data after timing setting is decreased.

6. The control method of a wireless communication terminal according to claim 5, wherein, when an operation in the standalone wireless communication terminal is impossible after timing setting, a variable value from the set value variable data is decreased to control such that the over-threshold does not occur.

7. The control method of a wireless communication terminal according to claim 4, wherein, when a plurality of set value variable data exist, if configuration data in an other wireless communication terminal exceeds the threshold value even though a set value is decreased to configuration data of a predetermined wireless communication terminal, a set value of the other wireless communication terminal is decreased such that the over-threshold does not occur.

8. A wireless communication terminal, which is supplied with power through an external device connection terminal to be power-supplied from an electronic apparatus and performs a processing according to a schedule, the wireless communication terminal comprising:
   a unit that changes the schedule based on:
   a minimum normal value in the electronic apparatus; and
   a temporary voltage drop according to the schedule in the wireless communication terminal.

9. A control method of a wireless communication terminal, which is supplied with power through an external device connection terminal to be power-supplied from an electronic apparatus and performs a processing according to a schedule, the method comprising:
   changing the schedule, based on:
   a minimum normal value in the electronic apparatus; and
   a temporary voltage drop caused by a power supply state of the wireless communication terminal.

\* \* \* \* \*